(12) United States Patent
Thompson et al.

(10) Patent No.: US 10,602,131 B2
(45) Date of Patent: Mar. 24, 2020

(54) SYSTEM AND METHODS FOR WAYFINDING AND NAVIGATION VIA MULTI-VIEW DISPLAYS, SIGNAGE, AND LIGHTS

(71) Applicant: Misapplied Sciences, Inc., Redmond, WA (US)

(72) Inventors: David Steven Thompson, Redmond, WA (US); Albert Han Ng, Redmond, WA (US); Paul Henry Dietz, Redmond, WA (US)

(73) Assignee: Misapplied Sciences, Inc., Redmond, WA (US)

( * ) Notice: Subject to any disclaimer, the term of this patent is extended or adjusted under 35 U.S.C. 154(b) by 494 days.

(21) Appl. No.: 15/410,508

(22) Filed: Jan. 19, 2017

(65) Prior Publication Data

US 2018/0115772 A1   Apr. 26, 2018

Related U.S. Application Data

(60) Provisional application No. 62/410,610, filed on Oct. 20, 2016.

(51) Int. Cl.
*H04N 13/368* (2018.01)
*H04N 13/398* (2018.01)
(Continued)

(52) U.S. Cl.
CPC ......... *H04N 13/368* (2018.05); *G06F 3/1423* (2013.01); *H04N 13/351* (2018.05);
(Continued)

(58) Field of Classification Search
CPC ............... H04N 13/0425; H04N 5/225; H04N 13/0406; H04N 13/0447; H04N 2013/0461
(Continued)

(56) References Cited

U.S. PATENT DOCUMENTS

| | | | |
|---|---|---|---|
| 5,855,425 | A | 1/1999 | Hamagishi |
| 6,339,421 | B1 | 1/2002 | Puckeridge |

(Continued)

FOREIGN PATENT DOCUMENTS

| | | |
|---|---|---|
| EP | 2685735 A1 | 1/2014 |
| WO | 0224470 A | 3/2002 |
| WO | 2013183108 A1 | 12/2013 |

OTHER PUBLICATIONS

"Non-Final Office Action", U.S. Appl. No. 15/002,158, dated Mar. 3, 2017, p. 19.

(Continued)

*Primary Examiner* — Ayman A Abaza
(74) *Attorney, Agent, or Firm* — Kaplan Breyer Schwarz, LLP

(57) ABSTRACT

Systems and methods for facilitating movement, including directing one or more entities along one or more path(s) and/or to (or away from) one or more destination(s) based on either: (a) a defining quality or feature or identity of the entity or (b) location-based considerations are disclosed. The systems are capable of presenting, from multi-view display devices viewable to many, different navigational content to different viewing zones, wherein a single multi-view display device can simultaneously present different content to different viewing zones wherein content presented to a particular viewing zone is only viewable from within that viewing zone.

24 Claims, 14 Drawing Sheets

(51) Int. Cl.
  *G06F 3/14* (2006.01)
  *H04N 13/351* (2018.01)
  *G09G 3/00* (2006.01)
  *H04N 13/30* (2018.01)

(52) U.S. Cl.
  CPC ........... *H04N 13/398* (2018.05); *G09G 3/003* (2013.01); *G09G 2354/00* (2013.01); *G09G 2380/06* (2013.01); *H04N 2013/403* (2018.05)

(58) Field of Classification Search
  USPC ...................................................... 348/39, 59
  See application file for complete search history.

(56) References Cited

U.S. PATENT DOCUMENTS

| | | | |
|---|---|---|---|
| 6,377,295 | B1 | 4/2002 | Woodgate et al. |
| 7,001,023 | B2 | 2/2006 | Lee et al. |
| 7,602,395 | B1 | 10/2009 | Diard |
| 7,990,498 | B2 | 8/2011 | Hong |
| 8,461,995 | B1 | 6/2013 | Thornton |
| 9,080,279 | B2 | 7/2015 | Jun et al. |
| 9,715,827 | B2 | 7/2017 | Ng et al. |
| 9,743,500 | B2 | 8/2017 | Dietz et al. |
| 9,792,712 | B2 | 10/2017 | Ng et al. |
| 2003/0115096 | A1 | 6/2003 | Reynolds et al. |
| 2003/0156260 | A1 | 8/2003 | Putilin et al. |
| 2005/0195330 | A1 | 9/2005 | Zacks et al. |
| 2007/0040892 | A1 | 2/2007 | Aoki et al. |
| 2009/0273486 | A1 | 11/2009 | Sitbon |
| 2010/0085517 | A1 | 4/2010 | Hong |
| 2010/0207961 | A1 | 8/2010 | Zomet |
| 2010/0214537 | A1 | 8/2010 | Thomas |
| 2011/0159929 | A1 | 6/2011 | Karaoguz et al. |
| 2011/0216171 | A1 | 9/2011 | Barre et al. |
| 2011/0242298 | A1 | 10/2011 | Bathiche et al. |
| 2011/0304613 | A1 | 12/2011 | Thoresson |
| 2012/0026157 | A1 | 2/2012 | Unkel et al. |
| 2012/0062565 | A1 | 3/2012 | Fuchs et al. |
| 2012/0105445 | A1 | 5/2012 | Sakai et al. |
| 2012/0140048 | A1 | 6/2012 | Levine |
| 2012/0218253 | A1 | 8/2012 | Clavin |
| 2013/0093752 | A1 | 4/2013 | Yuan |
| 2013/0114019 | A1 | 5/2013 | Ijzerman et al. |
| 2013/0169765 | A1 | 7/2013 | Park et al. |
| 2013/0321599 | A1 | 12/2013 | Harrold et al. |
| 2014/0015829 | A1 | 1/2014 | Park et al. |
| 2014/0035877 | A1 | 2/2014 | Cai et al. |
| 2014/0111101 | A1 | 4/2014 | McRae |
| 2015/0020135 | A1 | 1/2015 | Frusina et al. |
| 2015/0042771 | A1 | 2/2015 | Jensen et al. |
| 2015/0049176 | A1 | 2/2015 | Hinnen et al. |
| 2015/0062314 | A1 | 3/2015 | Itoh |
| 2015/0085091 | A1 | 3/2015 | Varekamp |
| 2015/0092026 | A1 | 4/2015 | Baik et al. |
| 2015/0154394 | A1 | 6/2015 | Kapinos et al. |
| 2015/0198940 | A1 | 7/2015 | Hwang et al. |
| 2015/0279321 | A1* | 10/2015 | Falconer .................. G09G 5/10 345/589 |
| 2015/0334807 | A1 | 11/2015 | Gordin et al. |
| 2015/0365422 | A1 | 12/2015 | Peterson et al. |
| 2016/0012726 | A1 | 1/2016 | Wang |
| 2016/0027029 | A1* | 1/2016 | Poole .................. G06Q 10/087 705/7.34 |
| 2016/0210100 | A1 | 7/2016 | Ng et al. |
| 2016/0212417 | A1 | 7/2016 | Ng et al. |
| 2016/0224122 | A1 | 8/2016 | Dietz et al. |
| 2016/0227200 | A1 | 8/2016 | Reitterer et al. |
| 2016/0227201 | A1 | 8/2016 | Ng et al. |
| 2016/0261837 | A1 | 9/2016 | Thompson et al. |
| 2016/0261856 | A1 | 9/2016 | Ng et al. |
| 2016/0293003 | A1 | 10/2016 | Ng et al. |
| 2016/0341375 | A1 | 11/2016 | Baker |
| 2016/0341377 | A1 | 11/2016 | Eddins |
| 2016/0366749 | A1 | 12/2016 | Dietz et al. |
| 2016/0371866 | A1 | 12/2016 | Ng et al. |
| 2017/0205889 | A1 | 7/2017 | Ng et al. |

OTHER PUBLICATIONS

Officer: Patricia Stein, "International Search Report and Written Opinion", dated Jun. 3, 2016, issued in PCT Application: PCT/US2016/04122, Publisher: PCT.
Officer: Jacinta Molloy, "International Search Report and Written Opinion", dated Sep. 29, 2016, issued in PCT Application No. PCT/US2016/037185.
"Office Action", dated Oct. 6, 2016, issued in U.S. Appl. No. 15/060,527.
Officer: Patricia Stein, "International Search Report and Written Opinion", dated May 12, 2016, Issued in PCT Appl. No. PCT/US2016/020784, Publisher: PCT.
"Non-Final Office Action", dated Jan. 26, 2017, issued in U.S. Appl. No. 15/088,912.
"Non-Final Office Action" dated Jan. 31, 2017, Issued in U.S. Appl. No. 15/180,341.
"Notice of Allowance and Fees Due", U.S. Appl. No. 15/180,341, dated Jul. 11, 2017, 7 pp.
"Notice of Allowance", Issued in U.S. Appl. No. 15/184,874, dated Sep. 8, 2017, 14 pp.
"Final Office Action", U.S. Appl. No. 15/002,164, dated Oct. 5, 2017, 27 pp.
"Final Office Action", U.S. Appl. No. 15/002,175, dated Nov. 2, 2017, 21 pp.
"Non-Final Office Action", U.S. Appl. No. 15/002,014, dated Oct. 27, 2017, 11 pp.
"Final Office Action", U.S. Appl. No. 15/015,099, dated Nov. 13, 2017, 14 pp.
"Non-Final Office Action", Related U.S. Appl. No. 15/184,874, dated May 22, 2017, 19 pp.
"Non-Final Office Action", Related U.S. Appl. No. 15/015,099, dated May 4, 2017, 9 pp.
Office Action received for European Application No. 16707570.4, dated Sep. 13, 2018, 6 pages.
Notice of Allowance and Fees Due (PTOL-85) received for U.S. Appl. No. 15/015,099, dated Dec. 18, 2018, 5 pages.
Non-Final Rejection received for U.S. Appl. No. 15/002,014, dated Jan. 15, 2019, 18 pages.
Non-Final Office Action received for U.S. Appl. No. 15/062,103 dated Oct. 11, 2018, 9 pages.
Non-Final Office Action received for U.S. Appl. No. 15/015,099 dated Oct. 12, 2018, 6 pages.
Final Rejection received for U.S. Appl. No. 15/944,366, dated Nov. 14, 2018, 26 pages.
Final Office Action received for U.S. Appl. No. 15/060,527 dated Oct. 5, 2018, 14 pages.
"Non-Final Office Action" in U.S. Appl. No. 15/062,103 dated Feb. 14, 2018.
"Advisory Action" received for U.S. Appl. No. 15/002,175, dated Jun. 21, 2018, 3 pages.
"Non-Final Office Action" dated Feb. 8, 2018 in U.S. Appl. No. 15/060,527.
"Non Final Office Action" dated Apr. 4, 2018 in U.S. Appl. No. 15/002,158, p. 23.
Examiner initiated interview summary (PTOL-413B) received for U.S. Appl. No. 15/060,527, dated Jan. 30, 2019, 2 pages.
Applicant Initiated Interview Summary received for U.S. Appl. No. 15/002,158, dated Sep. 24, 2018, 4 pages.
Advisory Action (PTOL-303) received for U.S. Appl. No. 15/944,366, dated Feb. 20, 2019, 3 pages.
Advisory Action (PTOL-303) received for U.S. Appl. No. 15/060,527, dated Jan. 30, 2019, 3 pages.
Advisory Action (PTOL-303) received for U.S. Appl. No. 15/002,158, dated Dec. 20, 2018, 4 pages.
Authorized Officer: Mehrdad Dastouri, "International Preliminary Report on Patentability" dated Feb. 3, 2017 issued in PCT International Application PCT/US16/14122, 21 pp.

(56) References Cited

OTHER PUBLICATIONS

"Non-Final Office Action", dated Mar. 22, 2017, Issued in related U.S. Appl. No. 15/002,164, 28 pp.
Officer: Jeffrey Harold, "International Preliminary Report on Patentability", Completed Mar. 20, 2017, Issued in International Patent Application PCT/US2016/020784, 6 pp.
"Non-Final Office Action", dated Mar. 24, 2017, Issued in related U.S. Appl. No. 15/001,175, 26 pp.
"Non-Final Office Action", U.S. Appl. No. 15/060,527, dated May 19, 2017, 13 pp.

* cited by examiner

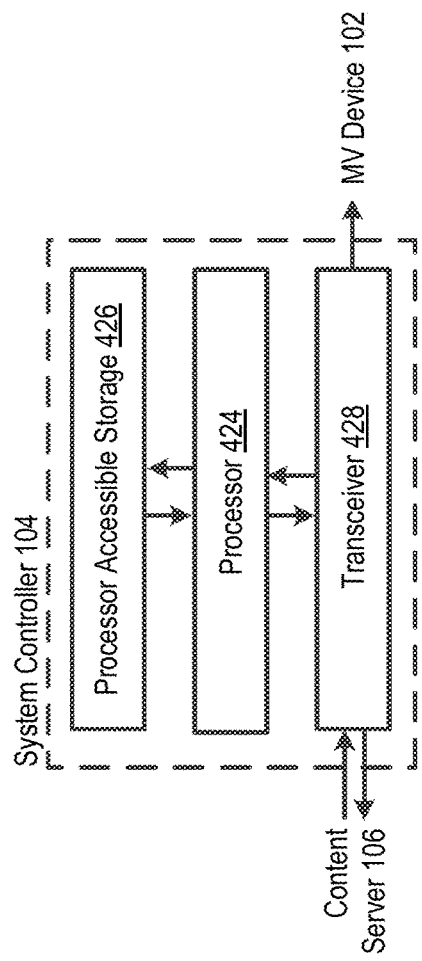
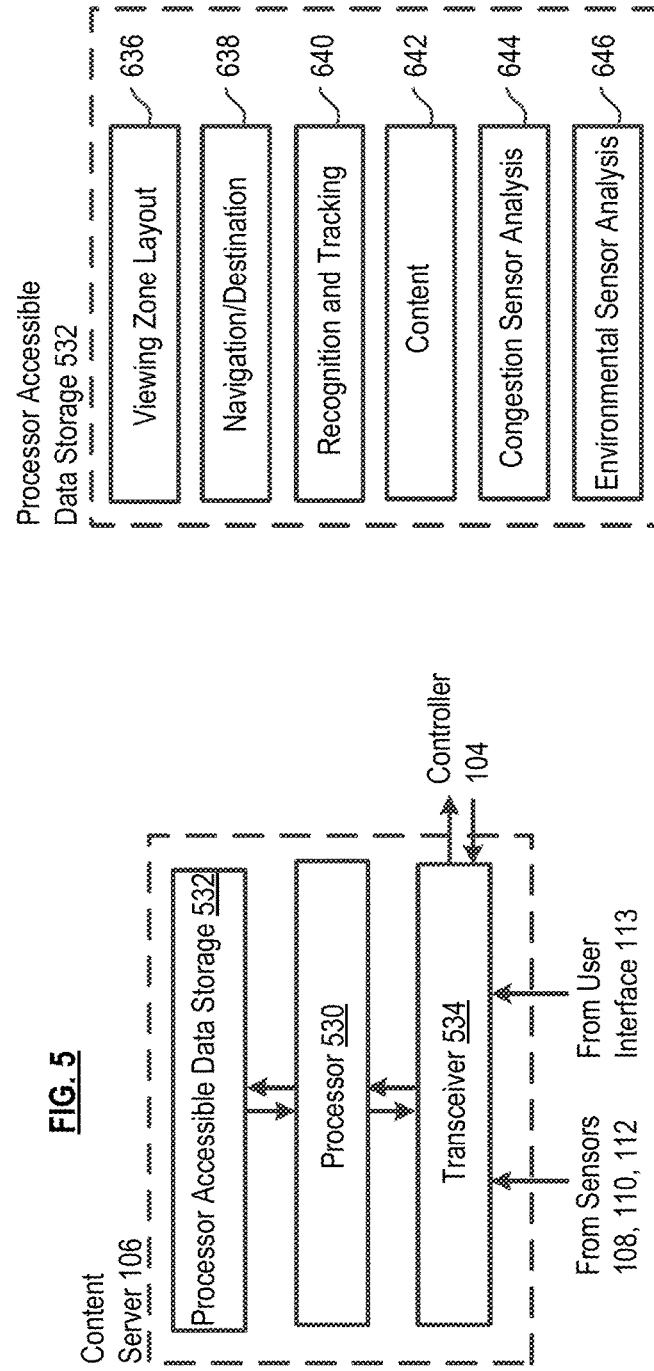

Exit Sign 768

Nav Sign 774

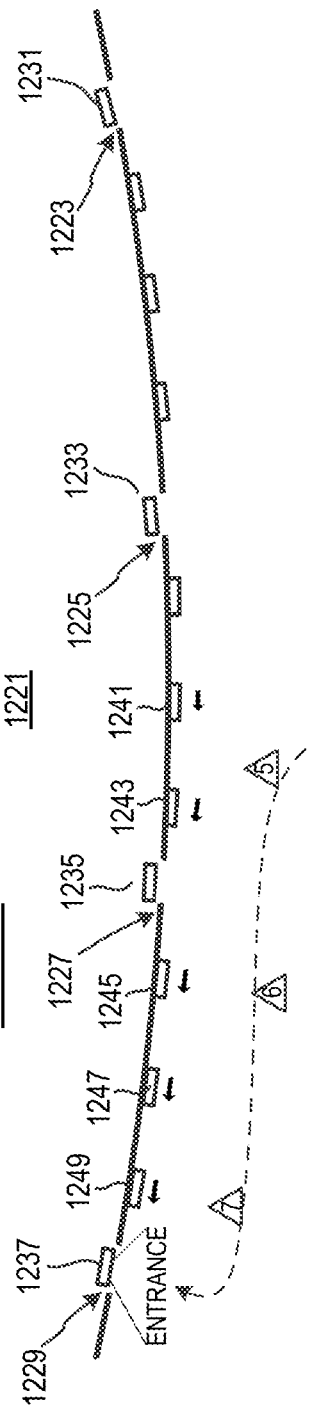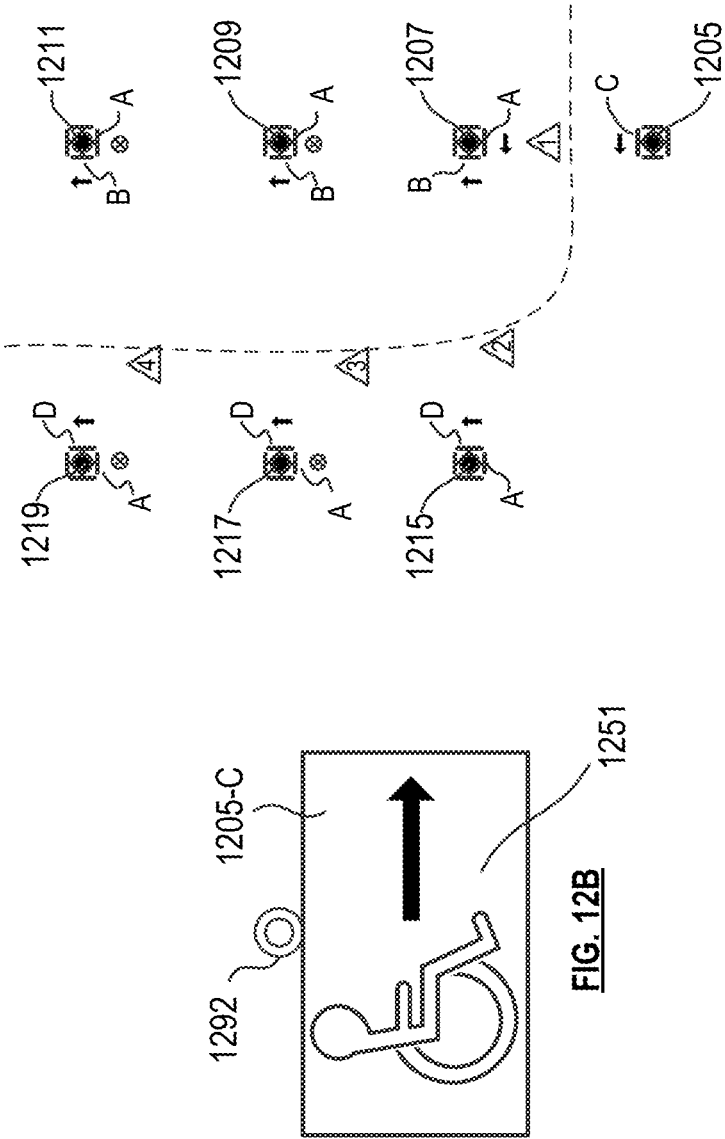

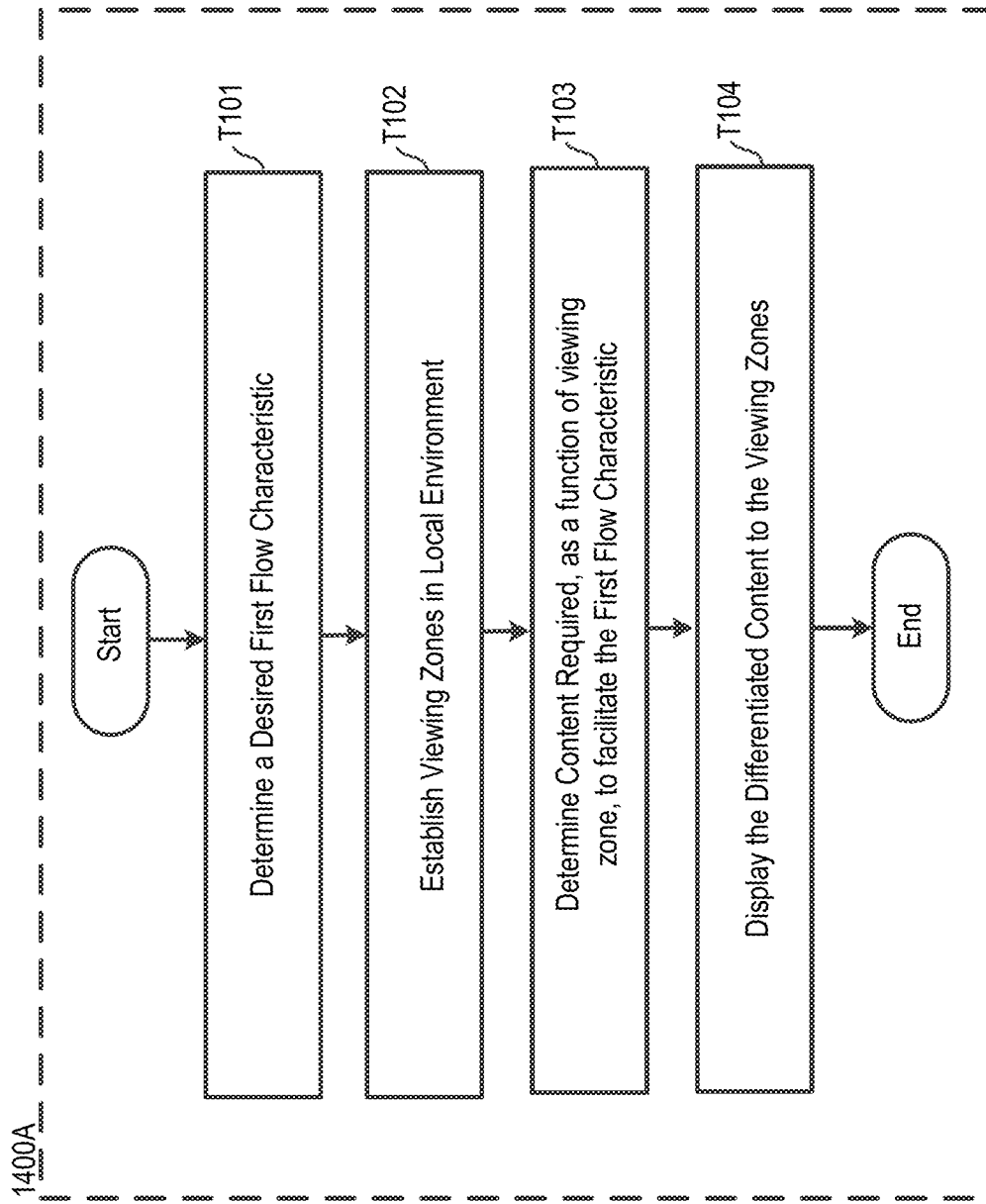

SYSTEM AND METHODS FOR WAYFINDING AND NAVIGATION VIA MULTI-VIEW DISPLAYS, SIGNAGE, AND LIGHTS

STATEMENT OF RELATED CASES

This case claims priority to U.S. Pat. App. No. 62/410,610 filed Oct. 20, 2016, which is incorporated by reference herein.

FIELD OF THE INVENTION

This case relates generally to multi-view displays and their use.

BACKGROUND OF THE INVENTION

Digital displays, signs, and lights used in safety, signaling, directional, and emergency applications often provide a rudimentary wayfinding or navigation function. More particularly, the "content" provided by such devices (e.g., red/amber flashing lights, illuminated arrows or the word "exit" presented via digital displays, a series of lights, etc.) often direct viewers in a particular direction, or to a particular location, or warn viewers to avoid a particular direction or location, etc.

Although all viewers looking at such devices at the same time see the same content, that content might be relevant to only certain viewers based on their identity and/or their particular location. In light of that, and the fact that such content is presented in a way that is, by design, very noticeable/prominent, it can confuse, distract, or even (ironically) present a hazard for viewers.

SUMMARY OF THE INVENTION

The present invention provides improved systems and methods for wayfinding and navigation.

Applying the methods disclosed herein, the inventive systems are capable of facilitating the movement of an individual, groups thereof, or conveyance(s) (collectively "entity" or "entities"), and doing so in a way that is, in at least some scenarios, more effective and more efficient than prior-art methods and systems. In some embodiments, the inventive systems are capable of directing one or more entities along a particular path(s) and/or to (or away from) a particular destination(s) based on either (a) a defining quality or feature or identity of the entity or (b) location-based considerations.

Unlike prior-art lights and signs, systems in accordance with embodiments of the invention are capable of presenting, from display devices viewable to many, wayfinding/navigational content to only the entity or select entities for which it is intended. This functionality is accomplished, in part, using "multi-view" lights, displays, etc., which are capable of simultaneously displaying different content to different viewing regions as a function of a difference in viewing angle (between the display, lights, etc. and the viewing location). Although rudimentary versions of multi-view displays currently exist, they are not in use in systems having the functionality described herein.

Specific embodiments of the invention, as disclosed below, emphasize the use of multi-view systems for directing and/or warning people. In many of these embodiments, the systems employ multi-view technology in the form of lights or signals, leveraging their capability to: (a) blink and flash, (b) quickly alternate between colors, and (c) fade and intensify as characteristics that can be varied depending on the location of the viewer. These characteristics are relatively more important for the present applications than for applications involving the delivery of complex media, as disclosed in Publ. Pat. App. US 2016/0224122.

In the illustrative embodiment, a multi-view signage system includes at least one multi-view (MV) device, a data processing and control system including a system controller and a content server, one or more user-interface devices and, optionally, a data acquisition system including multiple instances of one or more different types of sensors.

In various embodiments, the MV device is in the form of a display screen, a sign, one or more lights, or any other form factor capable of displaying light to a viewer. It is to be understood that the term "signage" is meant to include lights or other devices capable of projecting light as well as devices that are more appropriately characterized as signs.

The content server includes various specialized software for accomplishing the following tasks, among others: (i) defining aspects of viewing region of the MV device, (ii) processing data obtained by the optional sensors for identification, tracking, and decision-making purposes, and (iii) determining content. The system controller, among any other capabilities, controls the operation of the MV device. In particular, after receiving a description of the content to be displayed by the MV device from the content server, the system controller causes the MV device to generate and present light so that plural entities, as a function of location, can simultaneously view different location-dependent content.

The optional sensors acquire one or more of the following types of information:
   information related to the flow or movement of entities;
   information related to environmental conditions (e.g., temperature, light intensity, etc.); and
   information related to an entity (e.g., physical characteristics, characterizing information, etc.).

In some embodiments, different types of sensors are used to acquire the various types of information. In some other embodiments, a single type of sensor is used to acquire more than one of the various types of information. In some embodiments, information acquired by the sensor relates to more than one type of information. For example, information related to an entity, such as eye movement, head direction, body orientation, a flashing directional indicator, etc., can be tracked by a sensor and used to estimate where the entity is heading.

Additionally, the system optionally includes sensors for sensing any condition that will potentially cause the system to direct entities one way as opposed to another way, or change a final destination to which one or more entities are directed, or change the nature of an alert or warning.

In some embodiments, the content server accepts input from an operator via a user-interface, such as a tablet or smart phone. This input can be control information (e.g., from an operator of the system to establish parameters of the initial operation or to alter operation based on real-time conditions, etc.) or it can be information relating to characteristics of an entity or entities. The latter type of information (characteristics of entity) can also be obtained via an optional electromagnetic interrogation system, when sourced from a smart phone, RFID tag, and the like.

In some other embodiments, the various inputs mentioned above are received and processed by the system controller, rather than the content server. And in yet some further embodiments, the inputs referenced above are received and processed by processors other than those associated with the content server or the system controller.

In various embodiments, systems in accordance with the present teachings are capable of:

(a) Establishing fixed viewing zones and assigning (different) fixed content for viewing from each of those zones. Consider a movie theater having plural exits. It is desirable to have patrons leave the theater via specific exits as a function of where in the theater they are sitting. To that end, in some embodiments, a system in accordance with the present teachings segregates the theater into fixed viewing zones, each of which includes a group of seats. A MV exit sign is located above each of the exits, and each exit and its respective MV exit sign is associated with a particular viewing zone. In accordance with code, all the MV exit signs are illuminated. However, based on the system's assignment of viewing zones and the association therewith of a certain exit and MV exit sign, a given MV exit sign will appear to be illuminated to only those patrons seated in the associated viewing zone. Consequently, when the movie is over, patrons in a given viewing zone will head toward the one MV exit sign that appears to be illuminated. This will lead those patrons to the desired exit. In some other embodiments, a single large sign, visible throughout the theater, simultaneously displays "arrows" pointing in different directions to indicate to viewers in different fixed viewing zones which direction they should head to an exit. An arrow visible to those in any given viewing zone is not visible to those in other viewing zones.

(b) Altering viewing zones and/or the content viewable therefrom, in response to sensor readings (e.g., environmental factors, crowd congestion, etc.). Consider, once again, a movie theater. However, in this exemplary embodiment, the system includes sensors near the various exits. The sensors are capable of obtaining information that provides information related to a delay at each exit (e.g., an estimate of the rate of flow of patrons through each exit, the time it takes a patron to move a certain distance when near the exit, etc.). If the system determines from the sensor data that the one or more exits is congested, in some embodiments, the system alters the size of one or more viewing zones (to alter the number of patrons in such zones) and, hence, the number of patrons that proceed to the associated exit. Alternatively, the system can use the sensor data to reassign a viewing zone/exit association (i.e., alter content) to change the number of patrons heading to a particular exit.

(c) Assigning fixed content for viewing based on identity/characteristic of an entity. In some embodiments, a system in accordance with the present teachings is capable of acquiring features/characteristics of an entity and is further capable of tracking such individuals. Regarding acquisition of features/characteristics, this can include an ability to determine if a particular patron/viewer requires or is entitled to a special accommodation. Consider an airport terminal and a passenger that must get to a particular gate to catch a flight. In an exemplary embodiment, the system is capable of recognizing (but not necessarily "identifying") plural individuals, acquiring information about a flight/gate of interest and associating same with each individual, tracking the individuals, and controlling MV signs in the terminal to simultaneously direct (from the same signs) the various individuals to the appropriate gate.

The system also is capable of receiving and processing information concerning the status of some of such individuals as "elite" flyers due to miles flown. In such cases, the system can access information concerning special lounges for elite flyers, track the elite flyers, and direct them to such lounges. In a further exemplary embodiment, a system in accordance with the present teachings includes MV runway lights. The system acquires information concerning the runway on which a particular aircraft has been designated to land. The system controls the MV runway lights so they are only viewable to viewers (most importantly the pilot) on the designated aircraft; to other aircraft, those particular MV runway lights will be appear to be dark.

(d) Adapting content for viewing based on identity/characteristic of an entity in response to sensor readings. Consider a large conference venue. Certain exits are designed to accommodate individuals in a wheel chair or those who might be at some risk in a crowd (e.g., a person on crutches, etc.) In some embodiments, a system in accordance with the present teachings includes sensors near the exits. The sensors are capable of obtaining information that provides an estimate of the rate of flow of patrons through each exit, or an estimate of the delay at exit, or the time it takes a patron to move a certain distance when near the exit, etc. Thus, navigation content presented to someone requiring special accommodation can further depend on real-time sensor data. In other words, if the system were directing a wheel-chair-borne individual to a particular exit, but received sensor information that the exit was jammed, the system can re-direct that individual to another appropriate exit. It is notable that the same signs, etc., that are directing wheel-chair borne individuals can simultaneously direct others who are not in need of assistance without either group being aware of the navigational content intended for the other group.

A system exhibiting capability (a) is characterizable as providing "location-based, non-adaptive navigation." A system exhibiting capability (b) is characterizable as providing "location-based, adaptive navigation." A system exhibiting capability (c) is characterizable as providing "entity-based, non-adaptive navigation." And a system exhibiting capability (d) is characterizable as providing "entity-based, adaptive navigation." It is to be understood that a system in accordance with the present teachings will provide one or more of capabilities (a), (b), (c), and (d).

It is notable that for systems/methods providing location-based, non-adaptive navigation or location-based, adaptive navigation, the navigational content presented does not depend on who/what is in a viewing zone. Rather, for such systems/methods, it is "presence" in a viewing zone, without regard to identity, etc., that is significant in terms of the viewable content.

It will be understood that for systems/methods that provide adaptive navigation, content can be made to "follow" an entity by reassigning the content presented in a viewing zone as the entity moves through successive viewing zones. Alternatively, content can be made to "follow" an entity by re-positioning the viewing zones as the entity moves.

Some specific embodiments of a multi-view signage system in accordance with the present teachings that incorporate the navigation and wayfinding teachings presented herein and possess one or more of capabilities (a) through (d) listed above, include, without limitation:

MV Cautionary and Instructional Lighting system. In various embodiments, multi-view traffic, warning, track switch, routing, one-way, and crossing signals, for example, simultaneously provide different signaling to different people and/or areas. For example, a MV track switch signal might only be visible to trains on certain tracks and contiguous areas. A MV wrong-way signal is only visible to vehicles in actual peril of making a turn into oncoming traffic. In some embodiments, these lights and signals have a different appearance as a function of proximity or other criteria to communicate urgency, immediacy, or relevance.

MV Directional Lighting system. In various embodiments, multi-view devices simultaneously provide different navigational guidance to different entities while not being viewable to entities for whom the lights are not intended. MV directional lighting systems have applications for directing conveyances as well as people. For instance, with respect to transportation, an embodiment of the present invention is a MV runway lighting system. Using this system, an aircraft approaching an airport will only see the lights outlining its designated landing strip, while lights for other runways are only viewable to aircraft that have been designated to land on such other runways. With respect to directing people, and returning to the airport as an example, when viewed from the ground, MV lights on structures, such as the control tower, terminal, or service buildings can be used to direct ground-support personnel associated with a particular aircraft to their proper position and simultaneously direct the ground-support personnel of associated with other aircraft to their proper position without confusing either of the support teams. Staying with the airport, in some embodiments, the MV lights viewable to ground personnel or to aircraft approaching for landing have a different appearance to tower personnel, who are coordinating the lights or monitoring automated systems for multiple viewing zones.

MV Exiting, Entrance, and Evacuation Signage system. In various embodiments, multi-view displays and signs simultaneously provide different routing instructions to different individuals, groups, or conveyances, to optimally distribute flow for safety, capacity, timeliness, fairness, impairment, and other criteria. For example, the most conspicuous exit to a person leaving a theater, building, or theme park might not be the safest or most efficient, in which case a MV exit sign guides that individual to the most advisable, rather than the nearest, exit. In some embodiments, MV exiting, entrance, and evacuation lights, signals, signage, and other forms of MV displays are incorporated into the ground, walls, ceiling, furnishings, architecture, landscape, or elsewhere in the environment and surroundings. Returning to the airport example, within an airline terminal, MV signage can be used to simultaneously direct individual passengers to different gates to catch their flights, wherein each passenger sees only the directions (e.g., a gate number, arrows, etc) intended for them.

MV Emergency-Response Directional Signage system. In various embodiments, multi-view signage directs emergency vehicles and personnel to a location from which the public is leaving or avoiding. In some embodiments, signage simultaneously provides different directions to those trying to reach the site of the emergency and those attempting to flee it.

MV Emergency Vehicle Lighting and other Emergency lighting systems. In various embodiments, multi-view emergency lights on law-enforcement, medical, and fire-suppression conveyances, and on barriers, cones, dividers, towers, and buoys provide an indication to those that need to be warned, such as traffic that needs to yield right-of-way, while not being a distraction to victims and on-site responders. In an illustrative embodiment, for vehicles surrounding an accident site, the MV emergency lights warn off approaching drivers, cyclists, and pedestrians, but do not distract victims, investigators, medical personnel, and others who might be adversely impacted by flashing and strobing lights.

A method applicable to all embodiments of the multi-view signage system disclosed herein comprises the tasks of:
 determining a desired first flow characteristic for a local environment;
 establishing viewing zones in the local environment;
 determining navigational content to be displayed for each viewing zone to facilitate the first flow characteristic, wherein the navigational content is differentiated such that the navigational content displayed to at least some viewing zones is different from the navigational content displayed to other of the viewing zones; and
 displaying the navigational content to the viewing zones simultaneously via a multi-view device, wherein the navigational content presented to any one of the viewing zones is only viewable from the one viewing zone to which same is presented.

BRIEF DESCRIPTION OF THE DRAWINGS

FIG. 4 depicts an embodiment of a system controller for use in conjunction with the system of FIG. 1.

FIG. 5 depicts an embodiment of a content server for use in conjunction with the system of FIG. 1.

FIG. 6 depicts an embodiment of the contents of processor-accessible data storage of the content server of FIG. 5.

FIG. 12B depicts a MV navigational sign and recognition sensor for use in conjunction with the system of FIG. 12A.

FIG. 12C depicts waypoints of a viewer for the environment depicted in FIG. 12A and the navigational content viewable at each such waypoint.

FIG. 14A depicts a method in accordance with the illustrative embodiment of the present invention.

DETAILED DESCRIPTION

All patent documents (e.g., patents and published patent applications) referenced herein are incorporated by reference.

Systems and methods in accordance with the present teachings are capable of facilitating the movement of one or more entities, which includes without limitation, directing one or more entities along one or more paths or to a particular destination based on either identity or location. As used in this disclosure and the appended claims, the term "entity" and its inflected forms refers to either or both of: one or more viewers (i.e., people) and one or more conveyances (e.g., cars, planes, trains, ships, etc.). As used in this disclosure and the appended claims, the term "user" and its inflected forms refers to either or both of: (1) an operator of the system or (2) a patron of the venue, etc., in which the system is utilized.

Figure 1:
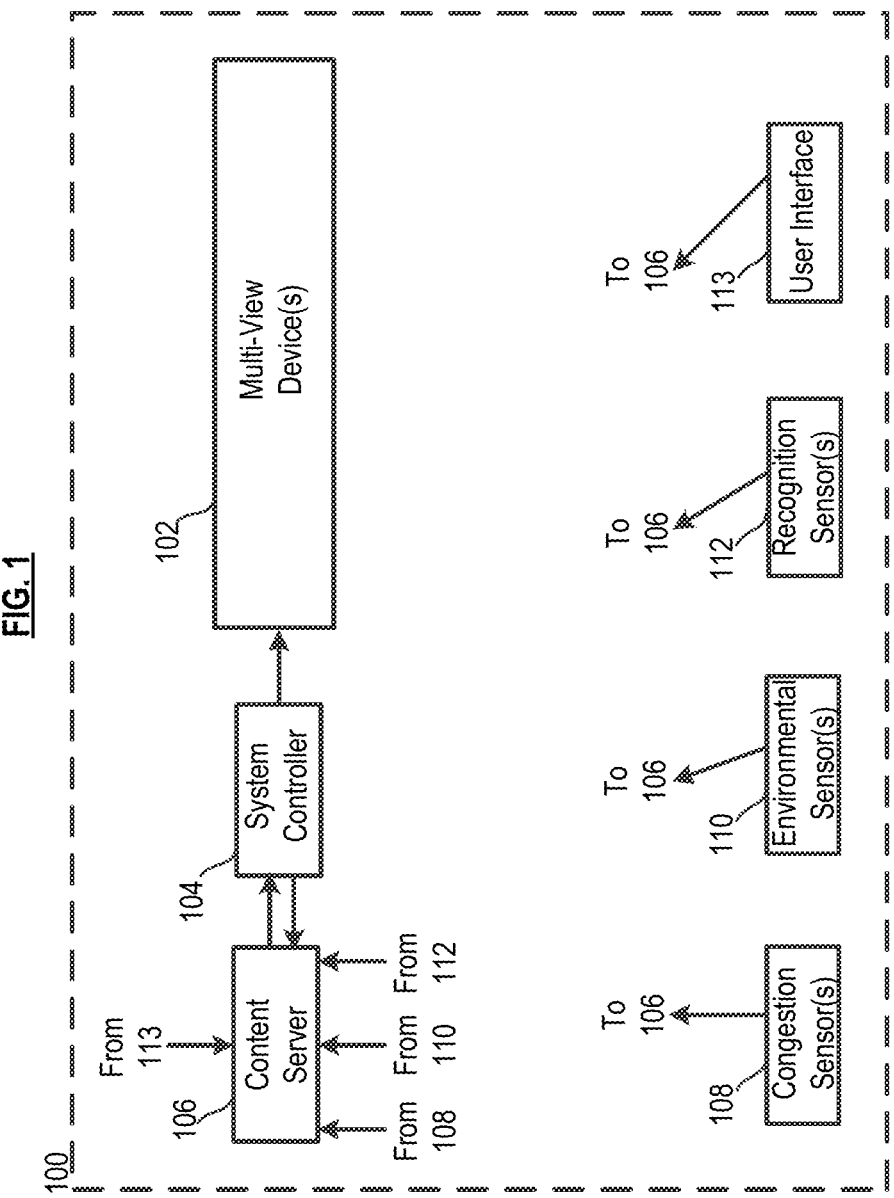
FIG. 1 depicts a system in accordance with an illustrative embodiment of the present invention.

As depicted in FIG. 1, system 100 in accordance with an illustrative embodiment of the invention includes at least one multi-view (MV) device 102, data processing and control system 103, and optional data acquisition system 107, and user interface 113.

In various embodiments, MV device 102 is in the form of a display screen, a sign, one or more lights, or any other form factor capable of displaying light or a message to a viewer. A multi-view device is capable of displaying different content to different entities that are located at different viewing positions with respect to the multi-view display. More particularly, MV device 102 simultaneously and selectively projects light rays ("beamlets") in different directions. One or more beamlets provide "content" to a viewer. MV device 102 is described in further detail later in conjunction with FIGS. 2 and 3.

Data processing and control system 103 includes system controller 104 and content server 106. Among other functions, content server 106 determines what particular content is to be presented by MV device 102. System controller 104 fetches the description of content from content server 106 and determines which particular beamlets of MV device 102 should be activated to generate and present the desired content simultaneously to different viewing regions.

Optional data acquisition system 107 includes one or more of the following: one or more instances of congestion sensor 108, one or more instances of environmental sensor 110, and one or more instances of recognition sensor 112. As previously mentioned, the segregation of sensors into sensors 108, 110, and 112 is for pedagogical purposes. More precisely, in some embodiments, the same type of sensor is used to sense more than one type (i.e., congestion, environment, recognition) of information. Furthermore, in some embodiments, one or more of sensors 108, 110, or 112, or a different type of sensor, is used to evaluate the intentions of an entity (using appropriate software) to anticipate what directions or signaling should be presented to them. "Intention" can be interpreted, for example and without limitation, from eye movement, expression, various behaviors, biometric feedback, etc. In the case of a conveyance, mechanical or operational factors can be sensed and interpreted (by appropriate software) to determine the directions/signaling that should be presented.

Congestion sensors 108 and environmental sensors 110, when included, obtain and provide data to the system that enables the system (in conjunction with appropriate software, to alter, in a variety of ways, the content viewable from any particular viewing position. Recognition sensors 112, when included, are able to obtain characteristics/qualities of entities so that, in conjunction with appropriate software, the system can recognize and track different entities towards the end of simultaneously providing different content to the various entities from the same MV devices.

User interface 113 provides at least one of the following functions:

Enables users to establish one or more parameters for the operation of system 100, such as:
  designating a destination in the local environment and transmitting the designation to the data processing and control system;
  defining flow characteristics of the local environment; establishing viewing zones.
Enables users to provide real-time information about local conditions (similar to that provided by congestion sensors 108 and/or environmental sensors 110) so that the system can update system operation (such as by altering content and/or viewing zones).
Enables patrons to provide information to the system that, in conjunction with the system's ability to track individual patrons, can be used to direct a particular patron to a particular location.
Enables users to control the assignment, design, presentation/appearance (e.g., brightness, sizing, color, other characteristics, etc.) of content.

The various elements of system 100 are now discussed in further detail.

It was previously disclosed that MV device 102 simultaneously and selectively projects light rays ("beamlets") in different directions. Various optical properties of the various beamlets emanating from MV device 102 are controllable, including, without limitation, color and intensity. And a beamlet can be rapidly turned "on" and "off," such that the beamlet can be "blinked" or "flashed." "Content," as the term is used in this disclosure and the appended claims, means whatever is delivered to a viewer via the operation of the MVD, including, without limitation, light, color, and complex media. The absence of light can be "content" as well. More specifically, "content" is representable, for example and without limitation, as light of one or more colors or simply white light, blinking or unblinking (continuous) light, light that fades or intensifies, and light that transitions between colors or states. Versions of content can vary, for example and without limitation, by characteristics such as flashing in different sequences or patterns, changing in brightness in different sequences or patterns, and alternating between different colors in different sequences, patterns or combinations. And a symbol, graphic, a lighting effect, or a simple message, such as "EXIT," "DANGER," "ONE-WAY," "NO TURN," "DON'T WALK" and the like is also considered to be "content," as that term is used herein. The descriptor "navigational," when used in conjunction with the word "content," (i.e., "navigation content") is meant to indicate that the content, in whatever form, provides information pertaining to:
  where or which way to go;
  where or which way not to go;
  to proceed;
  not to proceed; and the like.

Figure 2:
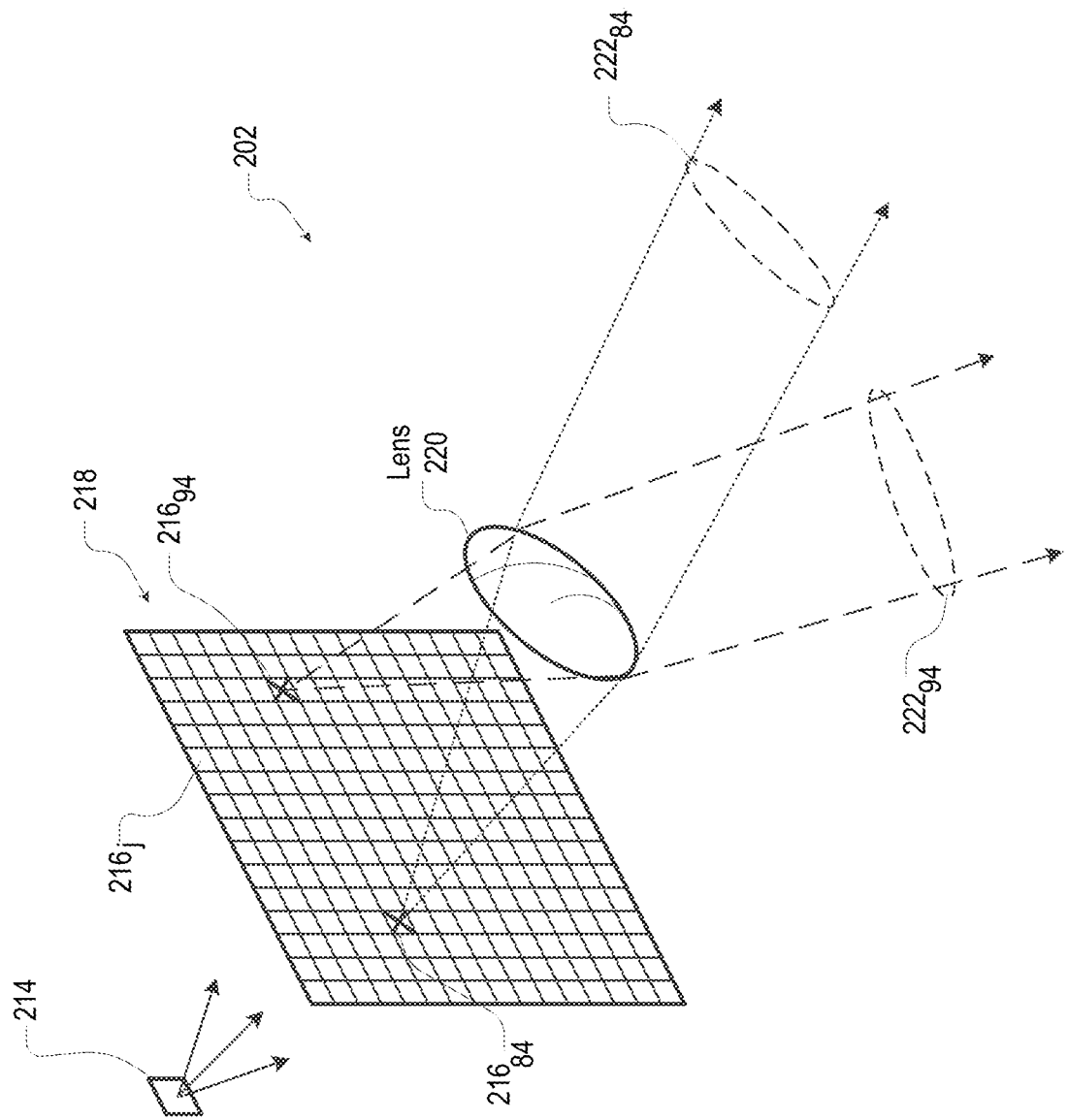
FIG. 2 depicts an embodiment of a MV light for use in the system of FIG. 1.

An embodiment of MV device 102, in the form of a MV light 202, is depicted in FIG. 2.

In this embodiment, MV light 202 is projector-based and includes 256 conventional pixels $216_j$ arranged in a 16×16 array 218. In other embodiments, the MV light can include less than or more than 256 conventional pixels. In fact, a current implementation includes about 500,000 conventional pixels and some next generation embodiments will include millions of pixels.

As indicated, MV light 202 can be implemented using a projector, such as a "pico-projector;" and any suitable projection technology (e.g., LCD, DLP, LCOS, etc.) can be used. Pico-projectors are commercially available from Texas Instruments, Inc. of Dallas, Tex. and others. Briefly, a pico-projector includes an LED light source; collection optics, which direct the light from the LED to an imager; an imager, typically a DMD (digital micromirror device) or an LCOS (liquid-crystal-on-silicon) device, which accepts digital-display signals to shutter the LED light and direct it to the projection optics; output or projection optics, which project the display image on the screen and also permit functions such as focusing of the screen image; and control electronics, including the LED drivers, interfacing circuits, and the video and graphics processor. See, e.g., www.embedded.com/print/4371210. In some embodiments, off-the-shelf pico-projectors are modified, for example, to reduce brightness compared with conventional projection applications.

FIG. 2 presents a greatly simplified representation of projector operation, focusing on the aspects that are germane to an understanding of the present invention. Light, such as from light source 214, is directed toward pixel array 218 (e.g., the DMD or LCOS device, etc.). Although light source 214 is depicted as being located behind pixel array 218, in some other embodiments, the light source is disposed in front of the pixel, as a function of the projector technology.

The plurality of conventional pixels $216_j$, in combination with lens 220, defines a "multi-view pixel" capable of generating a plurality of beamlets, each with a unique emission direction. See, Publ. Pat App. US 2016/0212417. Thus, MV light 202, with its 256 conventional pixels, is capable of generating 256 beamlets.

More particularly, when one or more selected pixels are activated by system controller 104 (FIG. 1), the light impinging on such pixels is directed (via reflection or transmission) toward lens 220, which generates beamlet $222_j$ from the received light. Consider, for example, conventional pixels $216_{84}$ and $216_{94}$. When activated, conventional pixel $216_{84}$ directs the light it receives toward lens 220. That light propagates from pixel $216_{84}$ in all directions. Lens 220 collects a sizable fraction of that light and collimates it into beamlet $222_{84}$. Similarly, when conventional pixel $216_{94}$ is activated, it directs the light it receives toward lens 220. That light propagates from pixel $216_{94}$ in all directions, a sizeable fraction of which is collected by lens 220 and collimated into beamlet $222_{94}$. By virtue of the fact that conventional pixels $216_{84}$ and $216_{94}$ have a different angular orientation (in 1 or 2 directions) with respect to lens 220, the emission directions of respective beamlets $222_{84}$ and $222_{94}$ will differ from one another.

If, for example, pixel $216_{84}$ passes blue light when activated, then a viewer whose eyes receive beamlet $222_{84}$ will see a blue "dot." If pixel $216_{94}$ passes red light when activated, then a viewer whose eyes receive beamlet $222_{94}$ will see a red "dot." The size/appearance of the "dot" can vary in size and shape based on the operation of lens 220.

As previously indicated, by virtue of its 256 pixels and lens, MV light 202 depicted in FIG. 2 is able to emit as many as 256 different beamlets. Each beamlet $222_j$ can be a different color and/or intensity from some or all of the other pixels of the same MV light and each can (and usually will) have a different emission direction. Furthermore, the beamlets can be individually made to blink or flash. Although less useful in conjunction with embodiments of the present invention, beamlets can also be made to differ in other properties of light, including, for example, spectral composition, polarization, beamlet shape, beamlet profile, overlap with other beamlets, focus, spatial coherence, and temporal coherence.

Figure 3:
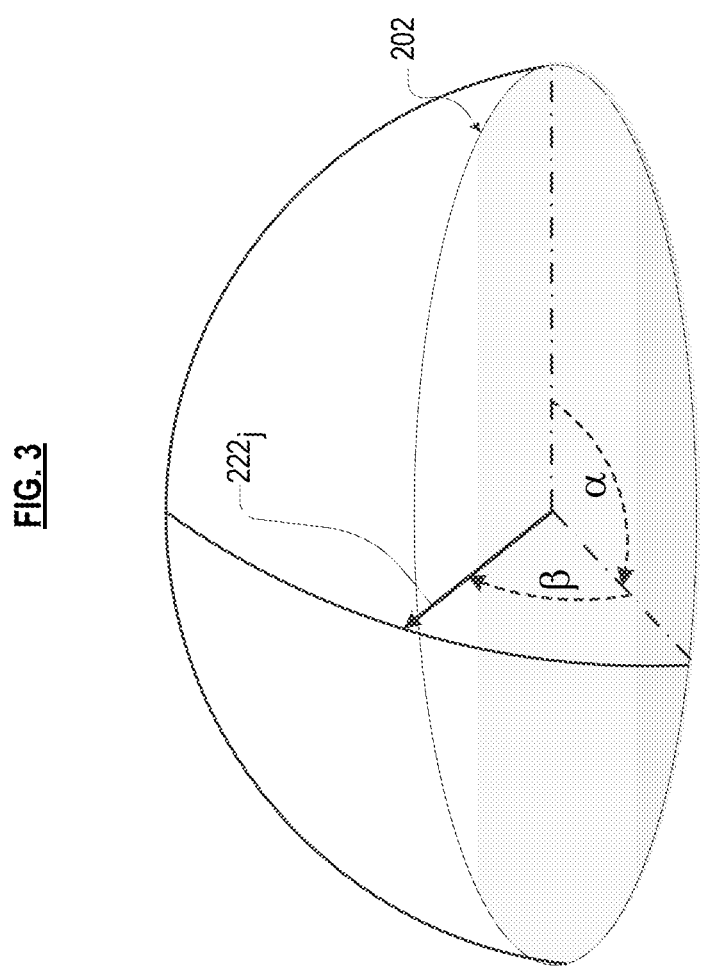
FIG. 3 depicts an orientation of a beamlet emitted from the MV light of FIG. 2.

As depicted in FIG. 3, the emission direction of beamlet $222_j$ is characterized by two angles, such as azimuth $\alpha$ and altitude $\beta$. It is notable that although beamlets are depicted in the accompanying figures as simple lines with an arrowhead indicating their direction of emission, they can have an angular extent and can be any shape. For this reason, characterizing the beamlet using the aforementioned two angles is necessarily an approximation. For example, and without limitation, beamlets might have a shape similar to the beam from a searchlight, but typically smaller. Furthermore, the conventional pixels that compose each MV light can be arranged in a circular pattern, a quadrilateral pattern, or any other convenient arrangement.

Some embodiments of a MV light are known in the art (such as when based on a pico-projector). A key difference, however, when used in the context of the systems disclosed herein, is the manner in which the pico-projector, for example, is operated. In particular, the emission direction of each conventional pixel is determined and mapped to the environment of the system so that, in conjunction with the controller's ability to independently address each conventional pixel and control characteristics of the beamlet associated with each such pixel, different lighting content (which includes presenting lighting content to a first viewing zone but not to other viewing zones) can be simultaneously displayed (from the same MV light) to different viewing zones.

A further important feature of some embodiments of the invention is that the MV devices of the systems disclosed herein can be arranged by an installer in arbitrary physical configurations, yet still share, through the operation of the controller, a common understanding of the location of viewing zones so that desired lighting content is achieved with a single integrated system. This distinguishes some of the systems disclosed herein, for example, from multi-view displays disclosed by applicant (see, e.g., Publ. Pat. App. US 2016/0212417). In particular, such multi-view displays comprise a plurality of multi-view pixels, which are: (1) typically constrained to a planar arrangement, (2) point in the same direction, and (3) are all visible from any viewing location. In such multi-view displays, the multi-view pixels are configured, at the time of manufacture, in a specific arrangement. By contrast, each MV light 202 defines a single multi-view pixel. In some of the systems disclosed herein, each multi-view pixel (each MV light) will be individually sited at arbitrary location and with an arbitrary direction with respect to other MV lights. Thus, the multi-view pixels of some of the systems described herein need not be constrained to a planar arrangement, do not necessarily point in the same direction, and often are not all visible from any viewing location. Furthermore, in some of the systems disclosed herein, the operator of the system, rather than the manufacturer, determines the arrangement of multi-view pixels with respect to one another.

In some of the systems described herein, the MV lights are separated from one another by a distance that is greater than the resolving power of the human eye as viewed from intended viewing zones. As such, each MV light will be distinctly resolved by a viewer. By contrast, in a multi-view display, each multi-view pixel is typically located very close to one another (sub-millimeter spacing) so that individual multi-view pixels cannot be separately resolved. The limit of resolution of the human eye is typically considered to be in the range of about 1 to 2 arc minutes. As such, in some embodiments, the MV lights of an installed system will be separated by a minimum of about 1 arc minute, as viewed from the intended viewing zones. In some embodiments disclosed herein, the multi-view pixels (i.e., each MV light) will be spaced at least by 1 meter or more.

As previously noted, in the illustrative embodiment, MV light 202 is projector based. In some other embodiments, MV light 202 is not projector based; rather, for example, the MV light comprises a conventional display panel over which a lens or array of lenses are placed. Each conventional pixel in the display is itself a light source, i.e., a material that is able to glow, emitting light when electrically excited with an appropriate electrical excitation (e.g., LED, OLED, etc.). Light from these individually addressable pixels is collected by one or more lenses. The lens collimates the light from a given one or more selectively activated conventional pixels to generate a beamlet. Each lens, along with the one or more conventional pixels of the "underlying" display from which the lens receives light, can thus be considered similar to an individual projection element of the previously discussed embodiment. When a viewer is in a first position with respect to the lens, the lens may appear to have the characteristics of only one or a small group of individual pixels beneath it. When the viewer moves to a second position with respect to the lens, the lens will appear to have the characteristics of a different one or different group of pixels, and so forth.

As a further alternative embodiment, a collection of individual lights (LEDs, spotlights, etc.), each pointing in a different direction and each being individually addressable, are grouped together to form a multi-view pixel. Each individual light generates a beamlet having a different emission direction than other lights in the grouping.

In some further embodiments, other techniques are used to transform a traditional individual pixel into a multi-view pixel; that is, a pixel that has a different appearance as a function of the angle/location from which it is viewed.

Several different implementations of a multi-view device are disclosed above. Any implementation of a MV device known to those skilled may suitably be used. Furthermore, embodiments of a MV device as disclosed in U.S. patent application Ser. No. 15/002,014, entitled "Method for Calibrating a Multi-view Display" may suitably be used in conjunction with embodiments of the present invention.

To provide the various forms of desired content to each of their corresponding viewing zones, a calibration procedure is used to determine the colors and brightness levels needed for each pixel, as well as the direction each color and level of brightness must be projected (or beamed) from each pixel. The calibration may be achieved through various means, including with the aid of a camera or cameras mounted on, or located near, the MV display, or through some other method. Calibration is disclosed in Publ. Pat. App. US 2016/0212417.

In some embodiments, a procedure is used for laying out viewing zones to designate which sightlines in which areas will see specific versions of content. This procedure may be aided by use of a camera or cameras on or near the display that relays the areas and vantage points from which the display may be seen. In this way, the viewing-zone design, which can be implemented either partially or completely by a human designer or either partially or completely via software, can take into account environmental criteria, such as obstructions, traffic patterns, viewer positioning, context, lighting conditions, and other variables. A method for accomplishing this is disclosed in Publ. Pat. App. US 2016/0261837.

In some embodiments, user interface 113, such as in the form of a tablet, laptop, smart phone, etc., running appropriate software enables an initial mapping of viewing zones and the assignment of various versions of content matched to each viewing zone; and for the timed, triggered, random, or real-time re-mapping of zones. In some other non-limiting embodiments, one of the following techniques is used to identify/designate viewing zones: (i) moving over them with a location-sensing technology; (ii) pointing to the zones or the boundaries thereof with a laser, light, or by other means; (iii) viewers establishing their location through the use of a device, gesture, command, identifier, or other means; (iv) through the use of markers, reflectors, sensors; (v) referencing a map, blueprint, or computer model.

As previously indicated, the operation of MV device 102 is managed via system controller 104, which is depicted in further detail in FIG. 4. Among any other capabilities, in some embodiments, system controller 104 fetches a description of the content, as determined at content server 106, and then directs the operation of the MV device, causing the MV device to display the content to a specific location in the viewing space (by causing the MV device to display certain beamlets).

As depicted in FIG. 4, system controller 104 includes processor 424, processor-accessible storage 426, and transceiver 428. Processor 424 is a general-purpose processor that is capable of, among other tasks, executing an operating system, executing device drivers, and executing specialized application software used in conjunction with the embodiments of the invention. Processor 424 is also capable of populating, updating, using, and managing data in processor-accessible data storage 426. In some alternative embodiments of the present invention, processor 424 is a special-purpose processor. It will be clear to those skilled in the art how to make and use processor 424.

Processor-accessible data storage 426 is non-volatile, non-transitory memory technology (e.g., ROM, EPROM, EEPROM, hard drive(s), flash drive(s) or other solid state memory technology, CD-ROM, DVD, etc.) that stores, among any other information, data, device drivers (e.g., for controlling MV device 102, etc.), and specialized application software, which, when executed, enable processor 424 to direct MV device 102 to present differentiated content for viewing by viewers at a plurality of locations. It will be clear to those skilled in the art how to make and use processor-accessible data storage 426.

Transceiver 428 enables communications with content server 106 and other devices and systems via any appropriate medium, including wireline and/or wireless, and via any appropriate protocol (e.g., Bluetooth, Wi-Fi, cellular, optical, ultrasound, etc.). The term "transceiver" is meant to include any communications means and, as appropriate, various supporting equipment, such as communications ports, antennas, etc. It will be clear to those skilled in the art, after reading this specification, how to make and use transceiver 428.

Although the illustrative embodiment depicts a single system controller 104, in some embodiments, the functionality of the system controller is distributed among several devices that might or might not properly be characterized as controllers. The operation of system controller 104 is discussed in Publ. Pat. App. US 2016/0212417.

Content server 106, previously discussed, is now described in further detail in conjunction with FIG. 5. Content server 106 includes processor 530, processor-accessible storage 532, and transceiver 534.

Processor 530 is a general-purpose processor that is capable of, among other tasks, executing an operating system and executing specialized application software used in conjunction with the embodiments of the invention. Processor 530 is also capable of populating, updating, using, and managing data in processor-accessible data storage 532. In some alternative embodiments of the present invention, processor 530 is a special-purpose processor. It will be clear to those skilled in the art how to make and use processor 530.

Processor-accessible data storage 532 is non-volatile, non-transitory memory technology (e.g., ROM, EPROM, EEPROM, hard drive(s), flash drive(s) or other solid state memory technology, CD-ROM, DVD, etc.) that stores, among any other information, data and specialized application software, which, when executed, enable processor 530 in various embodiments to perform, in whole or in part, one or more of the following functions, among others:

establish viewing zones;
generate navigation and/or destination information;
recognize entities, establish the location of entities, and track entities;
update operation (i.e., alter viewing zones and/or content) based on sensor readings; and
determine content for presentation.

The specialized software for enabling the aforementioned functionality is discussed later in this specification. It will be clear to those skilled in the art how to make and use processor-accessible data storage 532.

Transceiver 534 enables communications with, for example and without limitation, system controller 104, various sensors 108, 110, 112, and user interface device 113 via any appropriate medium, including wireline and/or wireless, and via any appropriate protocol (e.g., Bluetooth, Wi-Fi, cellular, optical, ultrasound, etc.). The term "transceiver" is meant to include any communications means and, as appropriate, various supporting equipment, such as communications ports, antennas, etc. It will be clear to those skilled in the art, after reading this specification, how to make and use transceiver 534.

Although the illustrative embodiment depicts a single content server 106, in some embodiments, the system includes multiple content servers. Furthermore, in some embodiments, the functionality of content server 106, with the exception of determining content, is wholly or in part provided by system controller 106 or other processing systems. To the extent such functionality is provided by the system controller or other processing systems, the appropriate specialized software may reside in a different storage location (e.g., processor-accessible storage 426, etc.).

FIG. 6 depicts some of the contents of processor-accessible data storage 532, including at least some of the specialized software that enables content server 106 to perform the tasks disclosed above. Included in data storage 532 are viewing zone layout software 636, navigation/destination software 638, recognition and tracking software 640, content software 642, congestion sensor analysis software 644, and environmental sensor analysis software 646.

For clarity of explanation, the various specialized software and functionality of system 100 is described below in the context of several examples, which are provided by way of illustration, not limitation. The following examples are representative of embodiments in which system 100 is implemented as an MV exit, entrance, and evacuation signage system.

Figure 7:
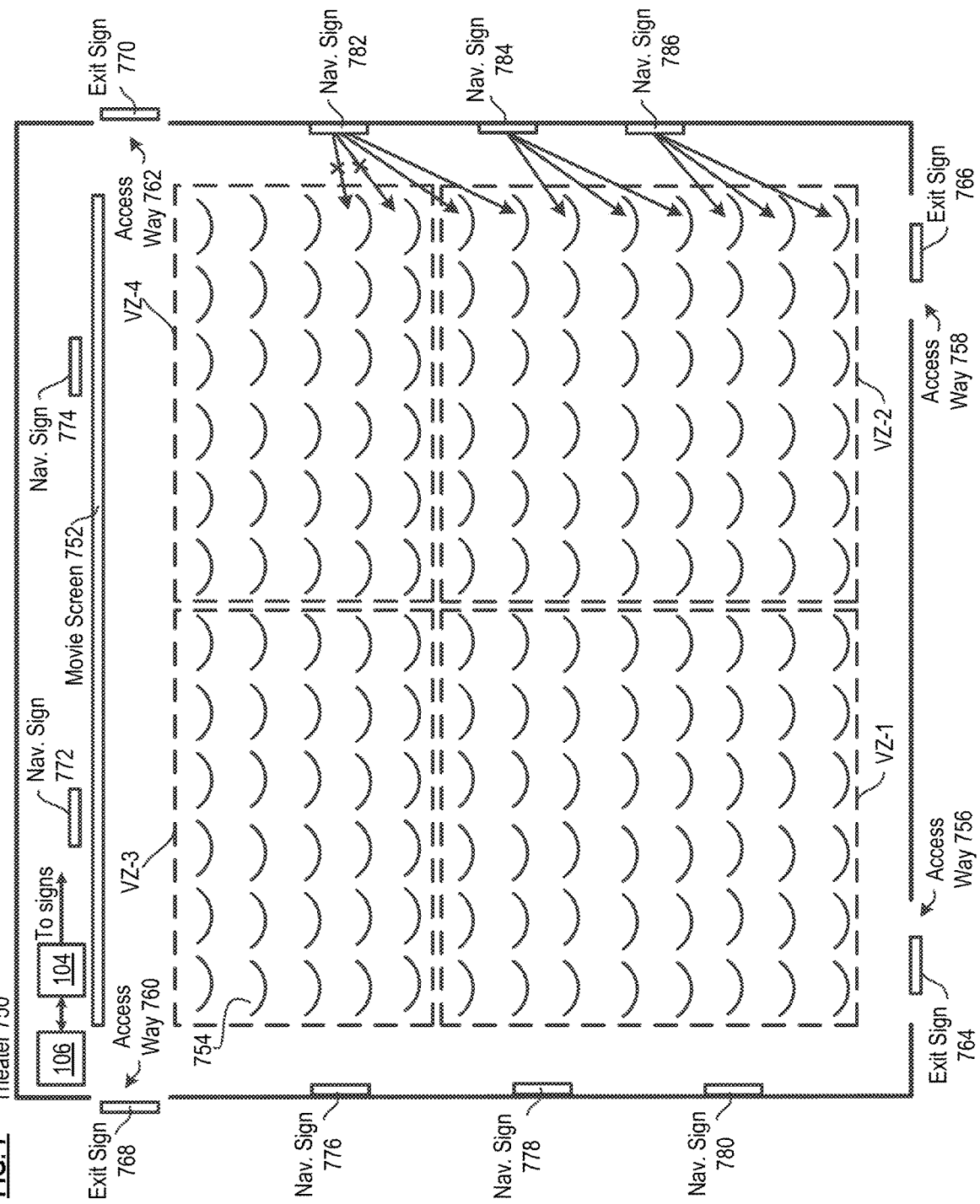
FIG. 7 depicts a system in accordance with the illustrative embodiment of the invention for use in a theater environment.
Figure 8:
FIG. 8 depicts a multi-view exit sign for use with the system of FIG. 7.
Figure 9:
FIG. 9 depicts a multi-view navigational sign for use with the system of FIG. 7.

Consider theater 750, depicted in FIG. 7. The theater includes movie screen 752, seats 754, and four access ways (entrance/exit) 756, 758, 760, and 762. The theater also includes an embodiment of system 100, including controller 104, content server 106, four multi-view "exit" signs 764, 766, 768, and 780 (one above each exit) and eight multi-view navigation ("nay") signs 772, 774, 776, 778, 780, 782, 784, and 786. An illustrative embodiment of the MV exit signs is depicted in FIG. 8 and an illustrative embodiment of the MV nay signs is depicted in FIG. 9. In some other embodiments, MV devices are blended with regular displays, screens, projections, printed and painted surfaces, and other media. They can serve, for example, as an extension of other signage, where only a portion of the sign has multi-view capabilities.

In the illustrative embodiment, theater 750 is "segregated" into four viewing zones VZ-1, VZ-2, VZ-3, and VZ-4. Within each zone are some of plural seats 754. A "viewing region" of a particular MV device, such as the MV exit signs or MV nay signs refers to all possible positions/locations from which viewers of the particular sign can experience the multi-view functionality. In particular, MV nay sign 774 emits beamlets in a range of possible directions. A viewer must be within that range in order to see at least one beamlet. For a viewer to see the content being presented from MV nay sign 774, such as "EXIT→" the viewer must be within the beamlet range of all MV pixels responsible for creating that image. The viewing region is the collection of all positions where these requirements are met. A "viewing zone" is typically a subset of a viewing region; that is, there are typically plural viewing zones in a viewing region. Based on a different viewing angle(s) in different viewing zones, different content can simultaneously be presented to different viewing zones by the MV device. In fact, there may be any number of viewing zones within sight of a single MV device, ranging from one or two, to millions and more. Furthermore, viewing zones can be established without regard to viewing angle. In other words, with no change in vertical or horizontal viewing angle, a first viewing zone can be established in front of a second viewing zone based on the locations of the zones in 3D space. See US 2016/0261837.

For example, it might be that the viewing region of MV nay sign 774 includes viewing zone VZ-4 as well as at least a portion of viewing zones VZ-1, VZ-2, and VZ-3. Yet, different content can be presented to those different viewing zones. For example, the content "EXIT→" can appear in MV nay sign 774 for viewers seated in viewing zone VZ-4 whereas MV nay sign 774 can appear to be unlit (no message) for viewers in viewing zones VZ-1, VZ-2, and VZ-3, or appear to be unlit for viewing zones VZ-1 and VZ-2 and display the content "← EXIT" for viewers seated in viewing zone VZ-3. Alternatively, the MV nay sign 774 can appear to be brighter for viewers in viewing zone VZ-4 than for viewers in the other viewing zones, etc.

In this example, the significance of the various viewing zones is that they are associated with a particular one of the access ways. In this context, the "association" of a viewing zone with a particular access way means that anyone seated in the particular viewing zone should exit theater 750 via the associated access way. Specifically, viewing zone VZ-1 is associated with access way 756, viewing zone VZ-2 is associated with access way 758, viewing zone VZ-3 is associated with access way 760, and viewing zone VZ-4 is associated with access way 762. This "association" is important because the system must know which particular content to display to viewers in the various viewing zones. It is to be understood that in other scenarios, multiple exits are associated with a particular viewing zone (or visa versa).

The viewing zones are ultimately based, at least in part, on flow characteristics; that is, which areas of the theater (i.e., which group of seats) should be exiting through which particular exits. In this case, that analysis may take into consideration various codes, regulations, etc., and might involve studies by safety engineers and review by a fire marshal, etc., to plan the safest, most effective exiting routes for a variety of scenarios. In some other scenarios, the analysis might not implicate safety and building regulations pertaining to the movement of patrons through exits, etc. In such scenarios, the analysis of the region under consideration can proceed based on nominal guidelines or optimization routines pertaining to flow distribution that is coded into software 636.

Viewing zones are established in conjunction with viewing zone layout software 636. In some embodiments, to lay out viewing zones, a camera is mounted on each MV exit sign so the designer can envision, through the camera's perspective, the total area from which the sign can be seen. In some embodiments, an interface is implemented using a desktop computer, laptop, tablet, etc., which is running layout software 636, so that the total viewing region—as imaged by the camera—can be subdivided into zones. In some embodiments, subdivision is performed by drawing an outline of each desired viewing zone on the image of the total viewing region using a stylus, etc. In some other embodiments, a designer moves through the actual space and designate each zone (e.g., via a wand, gestures, voice commands, laser, etc). In this example, the viewing zones correlate directly with the apportionment of seating to the various access ways.

In some embodiments, a simulation is performed to consider alternative viewing zone layouts. The simulation will typically model various capacity levels, seating distribution patterns, mobility of audience members, and other variables. Various viewing zone layouts are overlaid on the theater seating and aisle plan and assumptions are made as to what percentage of attendees are likely to be attracted to which sign. For instance, 60% might go toward the brightest, largest-font, multi-view exit sign; 20% to the nearest sign; and 20% to the exit sign by the longest line (based on the principle that a line attracts a line). With onsite and comparable venue data collection, these assumptions can be further refined. The simulation is also run for emergency and other scenarios. This simulation tool would enable optimizing viewing zone layouts for the widest range of conditions.

Thus, based on the apportionment of seats to access ways and the association of viewing zones to access ways, the viewing zones are established (i.e., which seats fall in which viewing zones). The perimeter of viewing zones can be defined by seat location, (e.g., row, column, for example). Other algorithms for establishing viewing zones as will occur to those skilled in the art in light of the present disclosure may suitably be used.

Alternatively, a theater operator can manually enter the coordinates (e.g., based on seat designation, etc.) of the viewing zones into software 636. Although the viewing zones depicted in FIG. 7 are rectangular, in other embodiments, the viewing zones can have different shapes. In some further embodiments, viewing zones are established by pointers (e.g., a laser, flashlight, etc.). In yet some further embodiments, viewing zones are designated by "walking" the perimeter of each zone with GPS or other location-sensing technology.

It was previously disclosed that a viewer seated in a particular viewing zone ought to exit theater 750 via the associated access way. Viewers are notified of the associated access way via the MV nay and exit signs.

For example, a viewer seated in viewing zone VZ-4 will be directed to associated access way 762 by MV nay sign 774 or MV exit sign 770. These signs are illuminated, for example, when the movie is finished. Likewise, a viewer seated in viewing zone VZ-3 will be directed to associated access way 760 by MV nay sign 772 or MV exit sign 768.

By virtue of the operation of the MV devices, either: (1) MV nay sign 772 and MV exit sign 768 will not appear to be illuminated to a viewer in viewing zone VZ-4 or (2) MV nay sign 772 will direct viewers to the "right" towards access way 762 (while simultaneously directing viewers in viewing zone VZ-3 to the left towards access way 760) and MV exit sign 768 will not appear to be illuminated or will perhaps display "NO EXIT" to viewers in viewing zone VZ-4.

Viewers in viewing zone VZ-2 are directed towards associated access way 758 by MV nay signs 782, 784, and 786. By virtue of the operation of the MV devices, MV nay sign 782 will not appear to be illuminated to a viewer in viewing zone VZ-4 (as indicated by the "x" through beamlets emanating from nay sign 782 toward the last two rows of seats in viewing zone VZ-4) or, alternatively, that sign will direct those viewers to access way 762 while simultaneously directing viewers in viewing zone VZ-2 to access way 758.

It will be appreciated that, in most venues, EXIT signs are required to be illuminated at all times. Thus, in the case of the EXIT signs, the systems described herein will make certain EXIT signs appear brighter, flashing, or otherwise differentiated from "normally" illuminated signs. Thus, the MV system provides a way to emphasize certain signs for viewers as a function of their location in a particular viewing zone, etc.

It is notable that the MV devices of the systems described herein are, in some applications (such as the theater example), designed and operated such that individual beamlets have an emission direction that is characterized by two angles, such as azimuth $\alpha$ and altitude $\beta$. (FIG. 3.) This is one way in which differentiated content can be presented to different lateral (left-right) viewing locations angles as well as to viewing locations that are at different depth (but the same lateral viewing angle) with respect to a display. This is why, for example, different content can be shown to right-most column of seats in viewing zone VZ-3 and the left-most column of seats in viewing zone VZ-4 as well as to the rear-most row of seats in viewing zone VZ-4 and the front-most row of seats in viewing zone VZ-2. When vertical viewing angle is used as a discriminator, the MV nay sign must be elevated, such as above the movie screen. This enables, for example, MV nay sign 774 to discriminate between the last row of seats in viewing zone VZ-4 and the front row of seats in viewing zone VZ-2. (Note that although MV nay signs 772 and 774 appear in FIG. 7 to be "behind" movie screen 752, they are not; they are above the screen.) Likewise, when using vertical viewing angle as a discriminator to provide differentiated content to viewing zones VR-3 and VR-4, MV exit sign 768 must be sufficiently elevated (and the sign must have sufficient resolution) such that a first viewer in the right-most row of seats in viewing zone VR-3 and a second viewer in the left-most row of seats in viewing zone VR-4 see different beamlets.

As previously mentioned, MV systems can be operated to provide 3D viewing zones, wherein a first viewing zone can be established in front of a second viewing zone, based on the locations of the zones in 3D space (even though there are locations in both the first and second viewing zones that receive content emitted from the same lateral and vertical viewing angles).

In some embodiments, the MV nay signs are controlled based on information generated by navigation/destination software 638 (FIG. 6). In particular, based on the association between a particular viewing zone and a particular access way, and based on the location of the MV nay sign with respect to the viewing zone, the software will determine, for example, in which direction a particular MV nay sign should direct viewers as a function of viewing zone.

Knowing the direction in which a viewer should be directed by a particular MV nay sign, content software 642 (FIG. 6) determines the content that should be displayed to so direct the viewer. For example, software 642 determines that MV nay sign 782 should present a right-facing ("downward" in FIG. 7) arrow to direct a viewer in viewing zone VZ-2 to access way 758. And software 642 determines that MV nay sign 782 should either not appear illuminated for viewers in viewing zone VZ-4 or that the sign should present a left-facing ("upward" in FIG. 7) arrow to direct a viewer in that viewing zone to access way 762. In some embodiments, an operator is involved with content selection, wherein a menu provides a choice among existing versions of content. Or, in some embodiments, an interface enables an operator to create custom content or perform a search to access content from other sources.

Each version of content may be designed not only to deliver the information intended for each viewing zone, but to compensate for viewing distance, angles, blockage, brightness, and other considerations. As conditions or preferences change, the design of the content can be adjusted real-time, or based on triggers, schedules, sensors, or observation. For instance, if the intended viewer of content in a specific viewing zone moves further away from the display, the font size of the content can be increased for improved visibility. Or, if lighting conditions change, the brightness, contrast, or color selections of the content can be altered.

Figure 10:
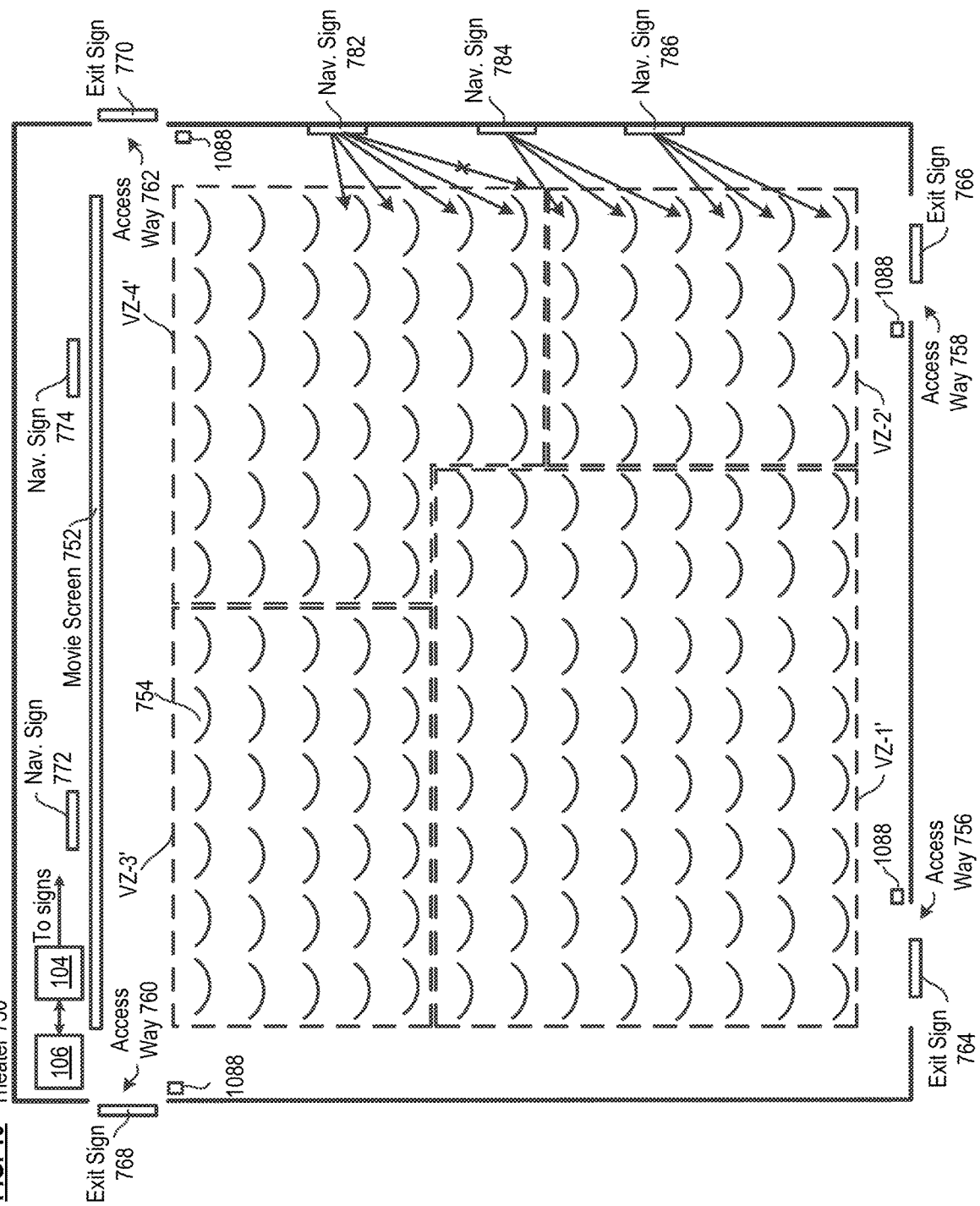
FIG. 10 depicts the system of FIG. 7 further including congestion sensors.

FIG. 10 depicts an alternative embodiment of the system depicted in FIG. 7. In addition to the elements depicted in FIG. 7, this embodiment includes congestion sensors for evaluating the flow of people through the access ways. (See also FIG. 1, sensors 108.)

The congestion sensors, identified in FIG. 10 as congestion sensors 1088, can be, for example and without limitation, active optical light beam sensors (infrared or visible), passive infrared sensors, thermal IR camera sensors, video camera sensors, floor-mounted pressure sensors, pulse ultrasound sensors, microwave radar sensors, laser scanners, mechanical counter sensors, pressure sensors, or seismic/vibration counter sensors.

Information pertaining to the flow of people (or more generally entities) typically, but not necessarily measured at or near access ways, is transmitted to content server 106 and is processed via congestion-sensor analysis software 644 (FIG. 6). With continued reference to FIG. 10, software 644 determines, for example, based on readings from sensors 1088 that movement through access way 758 is rather slow. The flow of patrons is quantified and, in some embodiments, an updated apportionment of seats-to-access ways is generated. For example, the original apportionment, such as depicted in FIG. 7, is 19 percent of the total seats are to exit through each of access ways 760 and 770 and 31 percent of the total seats are to exit through each of access ways 756 and 758. Based on the flow data from sensors 1088, it might be determined that the same 19 percent of the total number of seats are to exit through access way 760, 24 percent of the total number of seats are to exit through access way 762, 41 percent of the seats are to exit through access way 756, and 16 percent of the seats are to exit through access way 758.

Viewing zone layout software 636 accesses the updated flow characteristic (i.e., apportionment of seats to the various access ways) and establishes new viewing zones VZ-1', VZ-2', VZ-3', and VZ-4' based thereon and, if necessary, updates the association between each viewing zone and an access way. Based on the association between a particular viewing zone and a particular access way, and based on the location of a MV nay sign with respect to the viewing zone, navigation/destination software 638 will once again determine in which direction a particular MV nay sign should direct viewers as a function of viewing zone. In the example of FIG. 10, there is no change in the association of viewing zone and access way, but rather the particular seats within each viewing zone. Consequently, what has been altered is which particular seats are to leave through which exits. Note, however, that once a viewing zone is reconfigured, the physical (locational) relationship between a MV nay sign and a viewing zone might change. For example, in the embodiment of FIG. 7, MV nay sign 782 might appear unlit to viewers in viewing zone VZ-4 but illuminated to viewers in viewing zone VZ-2. However, in the embodiment of FIG. 10, as a consequence of the reconfiguration of viewing zones, MV nav sign 782 appears illuminated to viewers in viewing zone VZ-4' but unlit to viewers in viewing zone VZ-2'.

Content software 642 updates the content that should be displayed by any particular MV exit sign or nav sign based on the change in viewing zones, to appropriately direct the viewer. For example, software 642 determines that MV nav sign 782 should present a left-facing ("upward" in FIG. 10) arrow to direct a viewer in viewing zone VZ-4' to access way 762. And software 642 determines that MV nav sign 782 should either not appear illuminated for viewers in viewing zone VZ-2' or that the sign should present a right-facing ("downward" in FIG. 10) arrow to direct a viewer in that viewing zone to access way 758.

As the viewing zones are re-arranged and some viewers are redirected to other access ways, the flow of people through the various access ways will change. Congestion sensors will continue to monitor flow and the system will continue to update viewing zones and content in an attempt to optimize the flow of people through the access ways.

Rather than transmitting sensor data to content server 106 for analysis, in some embodiments, the data is transmitted to an operator of theater who implements the changes to the viewing zones, rather than the changes being performed exclusively via the specialized software.

Figure 11:
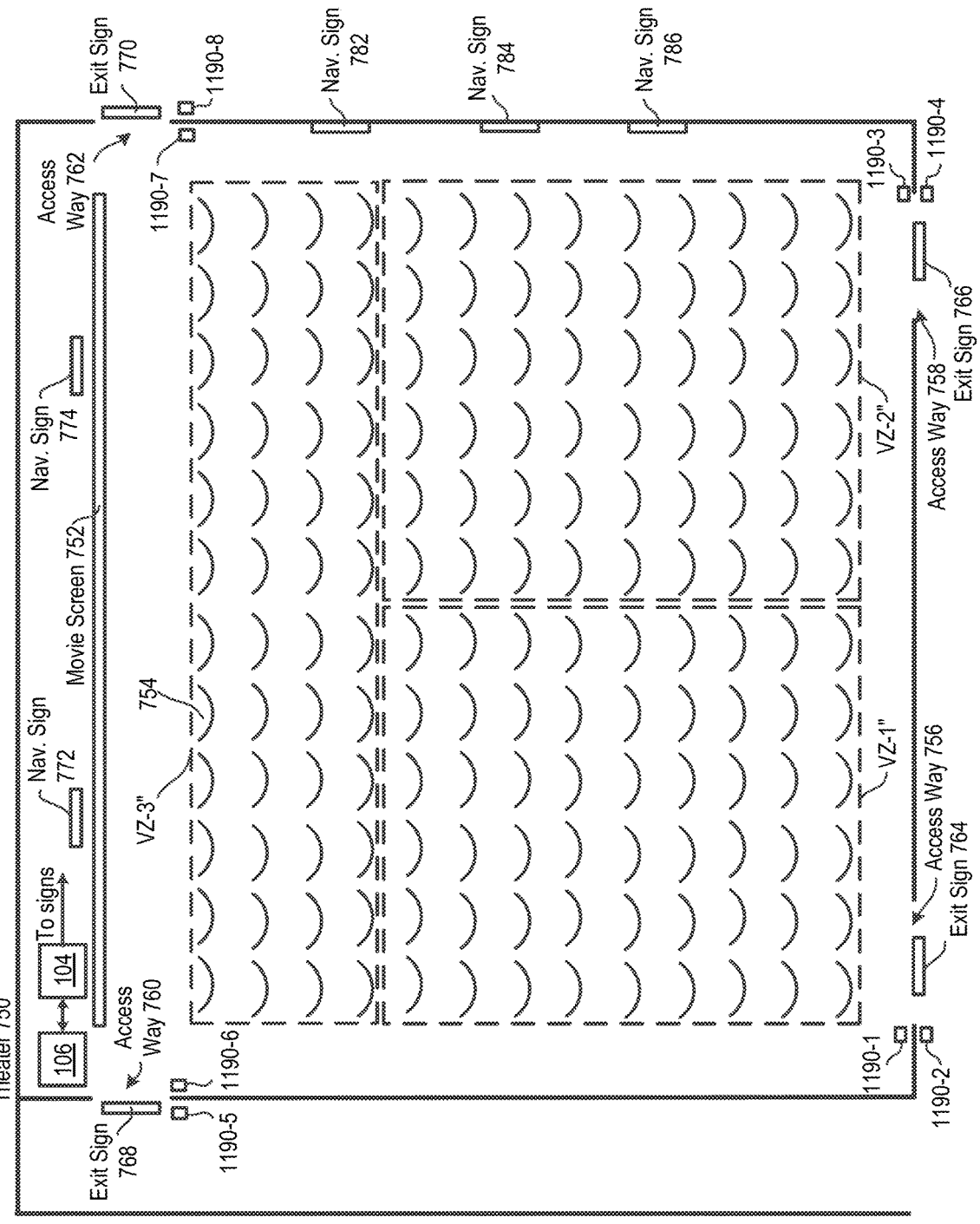
FIG. 11 depicts the system of FIG. 7 further including environmental sensors.

FIG. 11 depicts a further alternative embodiment of the system depicted in FIG. 7. In addition to the elements depicted in FIG. 7, this embodiment includes environmental sensors for evaluating ambient temperature, moisture, or other local conditions. (See also, FIG. 1, sensors 110.)

Various types of environmental sensors (temperature, heat, moisture, light intensity, etc.) are well known to those skilled in the art. Data from the environmental sensors, identified in FIG. 11 as environmental sensors 1190, is transmitted to content server 106 and is processed via environmental-sensor analysis software 646 (FIG. 6). Alternatively, the sensor data can be transmitted to a theater operator who performs the data analysis. Like congestion sensor analysis software, environmental sensor analysis software 646 can update the apportionment of seats to access ways based on sensor data.

For example, consider environmental sensor 1190-8, which is located at access way 762 and is the only environmental sensor that is located out-of-doors. Sensor data from sensor 1190-8 (as well as all of the other sensors) is transmitted to environmental sensor analysis software 646. From the analysis, it is determined that it is storming outside and that all viewers that would otherwise have been directed to access way 762 should be redirected to other access ways. A re-apportionment of seats to access ways is calculated. Viewing zone layout software 636 accesses the updated apportionment of seats (to the access ways) and establishes three new viewing zones VZ-1", VZ-2", VZ-3" based thereon and, if necessary, updates the association between each viewing zone and an access way.

Based on the association between a particular viewing zone and a particular access way, and based on the location of a MV nav sign with respect to the viewing zone, navigation/destination software 638 will once again determine in which direction a particular MV nav sign should direct viewers as a function of viewing zone. Content software 642 updates the content that should be displayed by any particular MV exit sign or nav sign based on the change in viewing zones, to appropriately direct the viewer. For example, MV nav sign 774, which in previous embodiments directed viewers to their "right" to exit through access way 762, will now direct viewers to their "left" to exit the theater through access way 760. Consequently, content software will specify an "arrow" pointing in the appropriate direction.

Figure 12A:
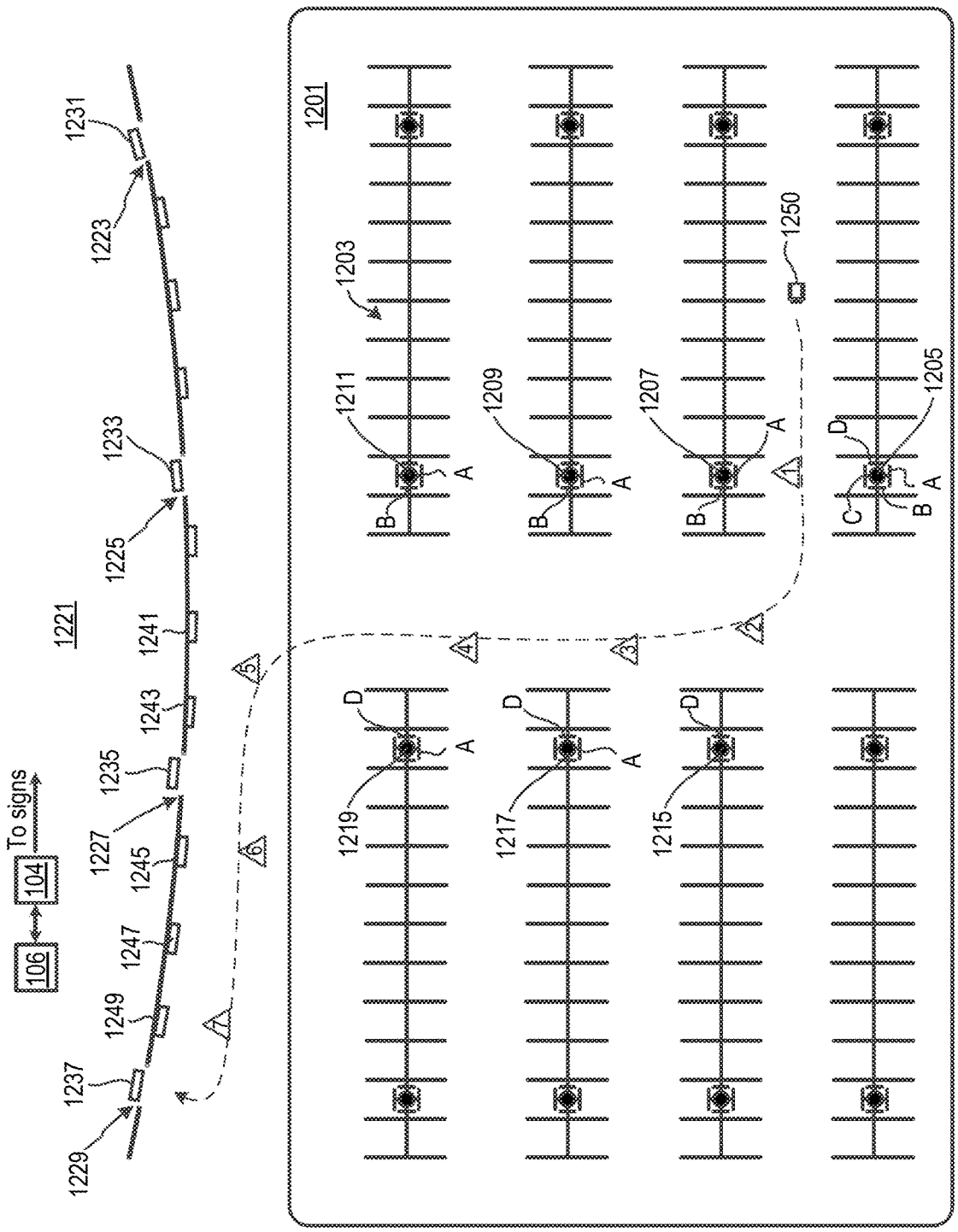
FIG. 12A depicts a system including recognition sensors in accordance with an embodiment of the invention.

FIG. 12A depicts a further embodiment of the system depicted in FIG. 7, although in this example, the system is installed in a large venue, such as a stadium. In addition to the elements depicted in FIG. 7, this embodiment includes "recognition" sensors. The intent of the recognition sensors is to "recognize" or "characterize" an entity, but not necessarily resolve "identity." (See also, FIG. 1, sensors 112.) For example, what is important is the fact that a particular person is in a wheel chair, not the actual identity of the person in the wheel chair.

Recognition sensors can be implemented, for example, as a machine/computer vision system that captures images or videos, an electromagnetic ("EM") interrogation system including an active trackable object (e.g., smart phone, etc.) that accompanies the entity, including, for example, an RFID system including readers for interrogation and a tag that accompanies the entity (e.g., incorporated in a badge, wrist band, etc.), and the like. Further detail concerning the recognition sensor systems is provided later in this specification in conjunction with FIGS. 13 and 14.

FIG. 12A depicts parking lot 1201 and stadium 1221. The parking lot includes a plurality of parking spaces 1203 and plural light posts, such as light posts 1205, 1207, 1209, 1211, 1215, 1217, and 1219. Attached to each light post are four MV navigational (nay) signs A, B, C, and D. The MV nay signs are situated high enough on the light poles so that they are visible over parked automobiles. The portion of the outside of stadium 1221 that is depicted in FIG. 12A includes four access ways 1223, 1225, 1227, and 1229. In this example, access way 1229 is specifically designed and designated to accommodate individuals in a wheel chair. Above each access way is a MV entrance/exit sign: signs 1231, 1233, 1235, and 1237. MV nay signs are attached to the outside of the stadium, and include MV nay signs 1241, 1243, 1245, 1247, and 1249. The MV entrance/exit signs and nay signs are driven by content server 106 and system controller 104.

FIG. 12B depicts further detail of a MV nay sign, such as MV nay sign 1205-C (the numeral identifies the "light pole" and the letter identifies which of the four nay signs on the light pole is being referenced). The MV nay sign is capable of presenting content 1251 (by illumination, as previously discussed). In the illustrative embodiment, recognition sensor(s) 112 are implemented in the form of imaging device 1292 (e.g., video camera, etc.), one of which is disposed above each MV nay sign.

Patron 1250, who is confined to a wheel chair, arrives in parking lot 1201. Recognition sensor/imaging device 1292 (as part of a machine/computer vision system) installed above one or more of the light posts captures an image of patron 1250 when the patron moves into the field-of-view of the sensor. Via subsequent processing of the sensor data (e.g., video feed, etc.), the system determines that the patron is in a wheel chair. The system will then direct patron 1250, via content presented in the MV nay screens, to "handicapped" access way 1229.

As the patron moves into the viewing region of successive MV nay signs, navigation content, such as depicted in FIG. 12B, is presented to guide the patron toward access way 1229. The "dashed" line appearing in FIG. 12A depicts the patron's path to access way 1229, with various waypoints "1" through "7" identified along the path.

The navigation content intended for patron 1250 will be viewable only to the patron and, as desired, to individuals in the immediate vicinity (assumed to be accompanying the patron), as a function of the patron's viewing angle with respect to the MV nay sign. Of course, the viewing angle constantly changes as the patron moves, so recognition sensors on the various light posts continue to track patron 1250 and the viewing zone layout software adjusts the viewing zone so that it stays with the patron. The location information acquired from recognition sensors (and the associated processing system) is transmitted to system controller 104, which determines which beamlets must be illuminated to cause the MV nay sign to display nay content to the patron as he moves.

FIG. 12C depicts a portion of the content that patron 1250 sees as he looks at the various NV nay signs. In particular, at waypoint 1, as the patron looks to his right, he sees a left-pointing arrow in MV nay sign 1207-A. As the patron looks to his left, he sees a right-pointing arrow in MV nay sign 1205-C. In some embodiments, the image of a person in a wheel chair, as depicted in FIG. 12B, is depicted along with the arrow to make it clear that the system recognizes that it is directing a wheel-chair borne individual.

At waypoint 2, as the patron looks right, he sees a left-pointing arrow in MV nay sign 1207-B. As the patron looks to his left, he sees a right-pointing arrow in MV nay sign 1215-D.

At waypoint 3, as the patron looks right, he sees an arrow pointing "upward" (i.e., meaning "straight ahead") in MV nay sign 1209-A, represented in the Figure as a "circle" with an "X." He also sees (or will see as he moves forward) a left-pointing arrow in MV nay sign 1209-B. As the patron looks left, he sees an upward-pointing arrow in MV nay sign 1217-A. He also sees (or will see as he moves forward) a right-pointing arrow in MV nay sign 1217-D.

At waypoint 4, as the patron looks right, he sees an arrow pointing "upward" in MV nay sign 1211-A. He also sees (or will see as he moves forward) a left-pointing arrow in MV nay sign 1211-B. As the patron looks left, he sees an upward-pointing arrow in MV nay sign 1219-A. He also sees (or will see as he moves forward) a right-pointing arrow in MV nay sign 1217-D.

As the patron advances toward waypoint 5, he sees left-pointing arrows in MV nay signs 1241 and 1243. MV entrance/exit signs 1233 and 1235 at respective access ways 1225 and 1227 will appear unlit to patron 1250 or perhaps display a left-pointing arrow or an "X".

At waypoint 6, patron 1250 sees left-pointing arrows in MV nay signs 1245 and 1247. And at waypoint 7, the patron sees a left-pointing arrow in MV nay sign 1249 and the content "ENTRANCE" appearing in MV entrance/exit 1237 above handicapped access way 1229.

Anyone outside of what the system designates as the viewing zone of patron 1250 will not see the content that is being presented to patron 1251. Rather, they will see either no content or, alternatively, based on where such other patrons are in the parking lot relative to a particular access way, they will be presented with directions that direct them to that access way.

Other than the recognition/tracking functionality, the system performs the same tasks as in the previous examples. That is, viewing zone layout software 636 (FIG. 6) must establish (and continually alter as the patron moves), the viewing zone to which content is to be presented. In some embodiments, the system might update the detected location periodically, rather than continuously. Because the patron may be in substantially continuous motion, at a particular point in time, they might have moved since the last detection/location update. If the patron moves beyond the previously detected location, they might lose sight of the content being displayed to them due to the location-dependent nature of the presentation of content via a MV device.

To address this issue, in some embodiments, viewing zone layout software 636 designates a personal viewing space around the patron at which to display the viewer's content. This permits the patron to move within the personal viewing space between location updates without losing sight of the content being displayed for their benefit.

Based on the destination (i.e., access way 1229), the patron's current position/viewing zone, and the location of the MV nav sign with respect to the patron's position/viewing zone, navigation/destination software 638 (FIG. 6) will determine in which direction a particular MV nav sign should direct the patron. Knowing the direction in which a viewer should be directed by a particular MV nav sign, content software 642 (FIG. 6) determines the content that should be displayed to so direct the viewer.

For clarity of presentation, the operation of congestion sensor(s) 108, environmental sensor(s) 110, and recognition sensor(s) 112 were discussed in separate embodiments. It is to be understood, however, that systems in accordance with the present invention can incorporate any one, any two, or all three of such types of sensors, or additional sensors. For example, assume that the system discussed in FIGS. 12A and 12C includes congestion sensors at the access ways and that access ways 1223 and 1229 are suitable designated for handicapped individuals. Assume that when patron 1250 is at waypoint 5, readings from the congestion sensor indicates that access way 1229 is congested. The system can then re-direct patron 1250 to access way 1223 by presenting appropriately altered content in MV nav signs 1243 and 1241 (right-pointing arrows, etc.).

Figure 13:
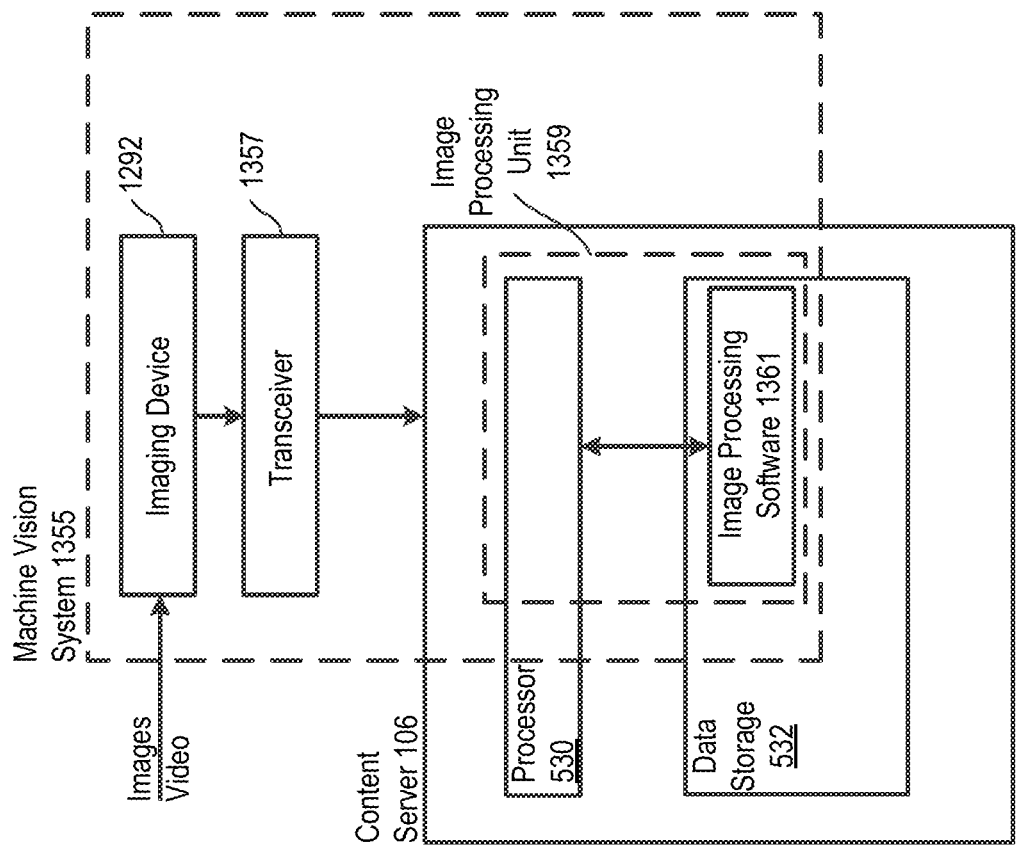
FIG. 13 depicts a machine/computer vision system for use in conjunction with some embodiments of the invention.

FIG. 13 depicts a machine/computer vision system, as used in conjunction with recognition sensors, to recognize and track entities. Additionally, the machine/computer vision estimates the location of the entity in a detection space (i.e., the region in which the vision system can detect/locate viewers). Location determination is required since, unlike the previously discussed scenarios, the viewing zone is not established in a fixed location, such as being defined by a block of seats in theater. It will be appreciated that in such embodiments, in addition to or as an alternative to the imaging device, other devices/techniques can be used for locating a viewer (e.g., RF triangulation techniques, GPS, etc.) in the detection space.

Referring now to FIG. 13, in the illustrative embodiment, salient elements of machine/computer vision system 1355 include recognition sensors/imaging device(s) 1292 for image acquisition, image processing unit 1359 for performing various digital image-processing techniques for extracting the requisite information from the images, and transceiver 1357 for transmitting data from recognition sensors/imaging device(s) 1292 to image processing unit 1359. In the illustrative embodiment, recognition & tracking software 640 is implemented as image processing software 1361.

In the illustrative embodiment, image processing is performed in content server 106. Consequently, in FIG. 13, image processing unit 1359 is notionally represented as image processing software 1361 being executed on processor 530 of the content server. It will be appreciated that image processing can occur in a dedicated image-processing server or in system controller 104. Furthermore, at least a portion of the image processing can take place in a suitably equipped recognition sensor/imaging device 1292.

Recognition sensors/imaging device(s) 1292 typically include one or more video cameras as well as lenses and lighting that are designed, collectively, to provide the requisite recognition and location determination that is required by subsequent processing. In some embodiments, the camera(s) is a depth-aware camera, such as structured light or time-of-flight cameras, which can generate a depth map of what is being seen through the camera at a short range, wherein this data is then used to approximate a 3D representation of what is being seen. In some other embodiments, the camera(s) is a stereo camera, wherein, using two cameras whose relations to one another are known, a 3D representation can be approximated by the output of the cameras. In some further embodiments, one or more standard 2D video cameras are used for image acquisition. In some additional embodiments, the imaging device comprises a radar system. Those skilled in the art will know how to make and/or specify and use various cameras, radar, or other imaging devices for the purposes of presence detection/location determination.

Machine vision system 1355 can employ conventional (2D visible light) imaging, although other techniques, such as imaging various infrared bands, line scan imaging, 3D imaging of surfaces or other techniques may suitably be used. Those skilled in the art will know how to select and use an appropriate imaging technique in conjunction with embodiments of the invention.

Any of a number of image-processing techniques may suitably be used for detection and recognition via image processing software 1361. For example and without limitation, image-processing software may implement any of the following techniques: stitching/registration, morphological filtering, thresholding, pixel counting, image segmentation, face detection, edge detection, blob discovery and manipulation, to name a few.

In some embodiments, as appropriate, an entity is provided with a passive trackable object, such as a badge, a wrist band, an arm band, eye glasses, or having some other suitable form factor (e.g., wearable, readily carried, attachable, etc.) for accompanying the entity (e.g., person, conveyance). The passive trackable object facilitates entity detection by rendering the entity more distinguishable from the surroundings than would otherwise be the case. In some embodiments, this is accomplished by imbuing the passive trackable object with certain surface characteristics (e.g., color, reflectivity, QR codes, patterns, etc.) that render it readily trackable and distinguishable from other surfaces in the detection space.

In some scenarios, patrons are "identified" by characteristics or associations that are not visually detectable. For example, some individuals in a group might be distinguishable by their membership in an "elite" group, such as individuals flying over 100,000 miles per year on an airline (which therefore entitles them to access a special lounge), or by having paid additional money for tickets at a sporting event that entitles them to enter a certain region of the sports venue, etc. This information can be encoded in an active trackable object, such as an RFID tag (e.g., incorporated in a wrist band, badge, etc.), smart phone having an appropriate App, or the like. The active trackable object can be interrogated by a suitable EM interrogation system to extract the "identifying" information, as is known in the art. Or the information can be input by the patron (e.g., manually entered, swiping/inserting/scanning a card, etc.) at a kiosk. When the information is obtained, it can be associated with a particular individual (e.g., associated with a particular "blob," such as when machine/computer vision system 1355 uses blob detection for image processing). As long as that particular blob is being tracked, content (e.g., navigation information, etc.) can be presented to a patron.

Once recognized as being a member of a particular group, etc., navigation/destination software 638 determines a destination. Based on the destination and the patron's current position/viewing zone, and the location of the MV nav sign with respect to the patron's position/viewing zone, navigation/destination software 638 determines in which direction a particular MV nav sign should direct the patron. Knowing the direction in which a viewer should be directed by a particular MV nav sign, content software 642 determines the content that should be displayed to so direct the viewer.

As an alternative to machine/computer vision system 1355, recognition sensors 112 can be implemented as an EM interrogation device. In some such embodiments, an entity is provided with an active trackable object having a form factor suitable for use with the entity (e.g. wrist band or badge for a person, a tag for a conveyance, etc.).

In some such embodiments, the active trackable object is detectable by the EM interrogation device, such as a beacon, or the active trackable object can otherwise wirelessly transmit information to one or more receivers. For example, in some embodiments, the active trackable object is a smart phone. Communication protocols/methodologies include, without limitation, Bluetooth, Wi-Fi, or the like. In some embodiments, the mobile devices detect signals from the beacons and transmit information (e.g., beacon signal strength, etc.) to facilitate location determination. In some other embodiments, the beacons detect signals from the mobile devices and re-transmit them to one or more computers for processing to determine the identities and locations of mobile devices. Alternatively, a mobile-device indoor location system or GPS can be used to detect the location of the mobile device users in the viewing space. The active trackable object thus serves as a proxy for the viewer.

In yet another embodiment, the EM interrogation device is an RFID reader. Patrons carry RFID tags (e.g., incorporated in a badge, wrist band, arm band, etc.) and RFID readers are placed throughout the environment of interest. The RFID readers detect each patrons' RFID tag, which provides characterizing information and location. The RFID thus serves as a proxy for the patron. The RFID tags can be active, utilizing internal power sources to communicate with RFID readers, or the RFID tags can be passive, utilizing RF energy from the RFID readers to power the circuitry to communicate with the readers. For the purposes of the present disclosure and the appended claims, a passive RFID tag is considered an active trackable object.

Additional tracking techniques include, without limitation, QR codes or other identification patterns on pins, stickers, wrist bands, badges, cards, or other media or wearables; or other bio-metric or clothing identification.

The foregoing provides a description of system 100. In accordance with the present teachings, system 100 is used in a variety of different contexts and environments to achieve safety, directional, and other benefits. To that end, system 100 can be embodied as a:

MV Cautionary and Instructional Signaling System;
    MV Directional Lighting System;
    MV Exit, Entrance, and Evacuation Signage System;
    MV Emergency Vehicle Lighting System; &
    MV Emergency Lighting System.

The above-disclosed embodiments of system 100 are described in further detail below. However, before doing so, a method in accordance with the present teachings is disclosed.

Method 1400A, depicted in FIG. 14A and which is applicable to all embodiments of system 100 described herein, recites the following tasks:

T101: Determining a desired first flow characteristic for a local environment;
    T102: Establishing viewing zones in the local environment;
    T103: Determining the content required, as a function of viewing zone, to facilitate the flow characteristic; and
    T104: Displaying the differentiated content to the viewing zones.

Figure 14B:
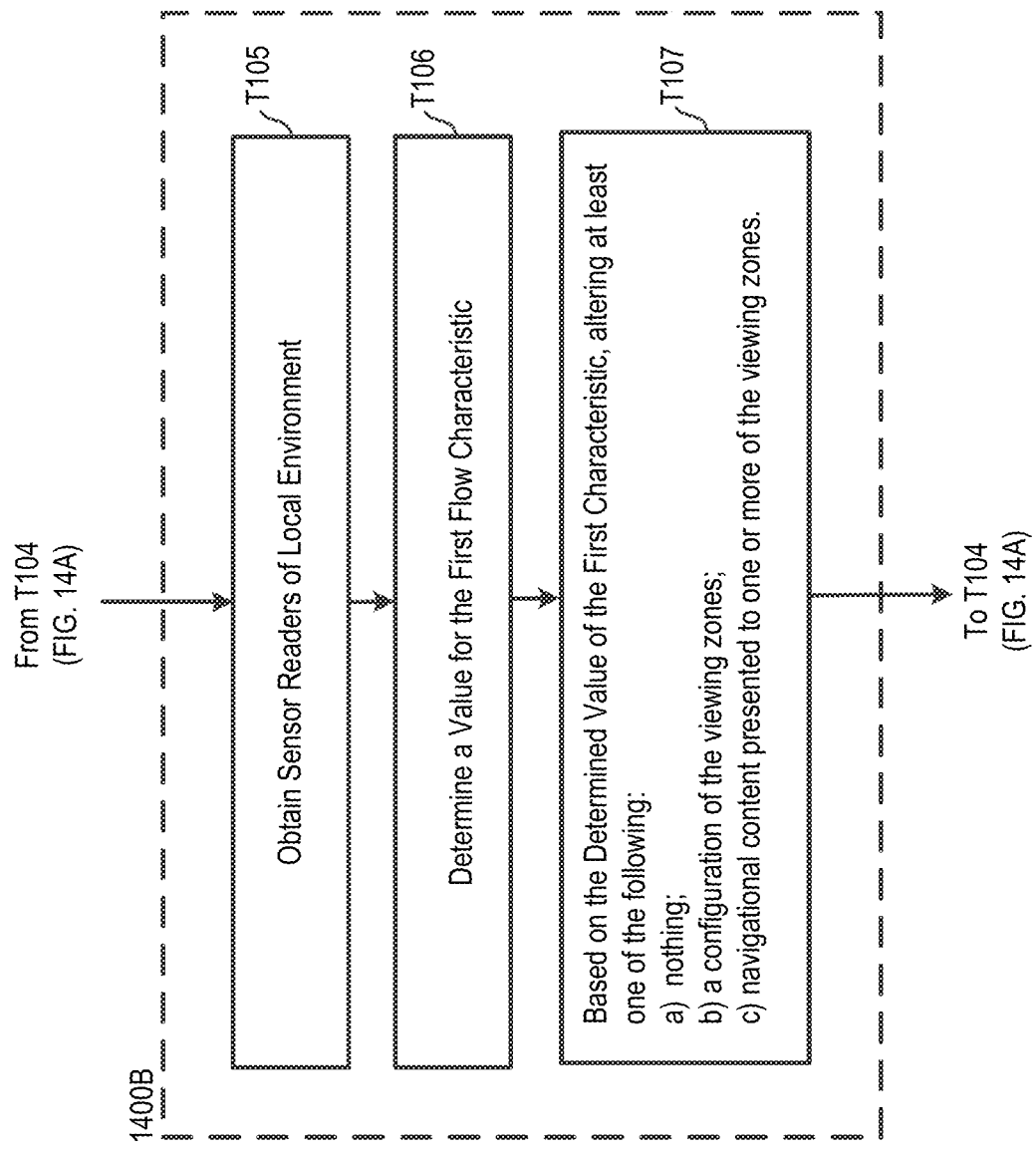
FIG. 14B depicts an optional method for use in conjunction with the method of FIG. 14A.

Method 1400B, depicted in FIG. 14B and which is applicable to all embodiments of system 100 described herein, recites the following tasks:

T105: Obtaining sensors readings of the local environment;
    T106: Determine a value of the first flow characteristic; and
    T107: Based on the determined value of the first flow characteristic, taking at least one of the following actions:
        (a) do nothing;
        (b) altering a configuration of one or more of the viewing zones;
        (c) altering the navigational content presented to one or more of the viewing zones.

Task T101 recites determining a desired first flow characteristic in a local environment. As used in this disclosure and the appended claims, the term "flow characteristic" refers to movement (i.e., speed and/or direction) of entities. Depending on context, the flow characteristic is the movement that the system (more specifically the navigational content that is displayed) is intended to create. For example, the operator of a theme park determines that patrons ought to move along a certain path to avoid creating a bottle neck. The flow characteristic can also be the observed movement of entities. For example, the system can evaluate the observed flow characteristic to determine if the desired flow characteristic was achieved.

The "flow characteristic" can be indicative of "purposefulness" of movement. That is to say, the relative certainty of movement exhibited by an entity, taking into account such behaviors as repeatedly changing direction or speed, or stalling, or exhibiting other characteristics that are indicative of confusion rather than confidence. In this regard, it is notable that lack of purposefulness is often the cause for traffic jams and overall congestion, not to mention accidents, all of which hinders movement and flow.

The flow characteristic is typically, but not necessarily, related to a destination in the local environment. Consequently, in at least some usage applications, a "sub-task" of task T101 is "establishing one or more destinations in the local environment." This sub-task is discussed in further detail below.

As used herein and the appended claims, the term "local environment" means the region in which system 100 will be operating to provide navigational guidance, etc., to entities. Thus, by definition, the local environment is the region in which MV devices are installed and extends to include the viewing regions of all such MV devices. Those skilled in the art will be able to define the "local environment" and its perimeter as a function of the nature of the usage application for system 100. For example, in various applications, the local environment is often a public venue, including those for entertainment, business, commerce, manufacturing, dining, health, transportation, government, education, military, accommodations. Some specific examples of a local environment include:

the interior of a theater (wherein MV exit signs and MV nav signs are installed);

the parking lot and interior of a stadium (wherein MV exit signs and MV nav signs are installed);

the parking lot and interior of a theme park (wherein MV exit signs and MV nav signs are installed);

the interior of an airline terminal (wherein MV nav signs are installed to direct passenger to an appropriate airline gate);

a region surrounding a hazard, the region extending as far as necessary to warn non-response individuals, as determined by safety personnel; and the airspace surrounding an airport, the extent of the airspace being suitable for directing inbound planes to a designated runway, as determined by airport operators.

As indicated above, in at least some usage applications, at least one or more "destinations" are established as an aspect of task 101. As used in this disclosure and the appended claims, the word "destination" and its inflected forms can mean a location to which an entity is being directed or is otherwise headed or a place that an entity is being directed to avoid. It is notable that in many cases, some entities are being directed to a particular destination, such as emergency response personnel, whereas other entities, such as passersby, are being directed away from the same destination.

By way of example, consider a scenario in which system 100 is embodied as MV cautionary and instructional signaling system; in particular a MV pedestrian crossing signal. In this scenario, the "destination" might be the sidewalk on the opposite side of the street from where pedestrians are standing and the flow characteristic is the movement of pedestrians crossing the street. In a further example, consider a scenario in which system 100 is configured as a MV directional lighting system for an aircraft runway. In this scenario, the "destination" is the runway and the flow characteristic is the approach of an airplane to (i.e., movement towards) the runaway for landing. When system 100 is implemented as MV exit, entrance, and evacuation signage system, the "destination" might be exits of a theater and the flow characteristic might be the movement of patrons towards and through the exits. When system 100 is configured as a MV emergency lighting system, the "destination" might be a hazard and the desired flow characteristic is the movement of pedestrians and vehicular traffic (other than response personnel) away from the hazard.

Task T102 recites establishing viewing zones in the local environment. The manner in which viewing zones are established has been discussed previously and will be discussed further later in this specification. In the various embodiments, the viewing zones are established as a function of considerations pertaining to the flow characteristics and/or the destination. For example, in the theater example, a determination is made as to which block of seats ought to exit the theater through which particular exits (to create a desired flow characteristic). That determination is a function of the proximity of the seats to the various exits and, potentially, the capacity of the exits. Viewing zones can then be established consistent with that determination (i.e., a viewing zone includes seats in the particular block that is intended for a particular exit). In the context of a hazard (i.e., a destination), for example, viewing zones can be based on a level of urgency of a warning based on the distance from the hazard. Any logical "grouping" can form the basis for a viewing zone. For example, in the context of a MV pedestrian crossing signal, the viewing zones might be based on the locations in which the system determines: (a) a pedestrian can easily cross before the light changes, (b) a pedestrian may be able to cross before the light changes, (c) a pedestrian will not be able to cross before the light changes. In some other embodiments, the viewing zone(s) stays with the entity. For example, in embodiments in which an entity is being tracked and content is displayed as the entity moves along, the viewing zone attaches to the entity. As used in this disclosure and the appended claims, the term "attach" and inflected forms thereof, when used to refer to a relationship between an entity and a viewing zone, means that the viewing zone is either periodically or continually re-established so that it stays with the moving entity such that navigational content can be provided thereto.

Task T103 recites determining the content required, as a function of viewing zone, to facilitate the flow characteristic. Consider, for example, a road hazard. The flow characteristic will be to move passersby away from the hazard (i.e., the destination). The need to redirect passersby will be more urgent the closer they get to the hazard. A plurality of viewing zones have been established as a function of the distance from the hazard. In a viewing zone that is further from the hazard, the nature of a warning will be less urgent than in a viewing zone that is closer to the hazard. Consequently, it might be determined that the content ought to be a flashing yellow-colored light in more remote viewing zones and a flashing red-colored light of high intensity in viewing zones close to the hazard.

In some situations, as will arise for example when system 100 is implemented as a MV exit, entrance, and evacuation lighting system, the determination of content will, in some embodiments, take into consideration the location/orientation of the entity with respect to the MV device, and the location/orientation of the MV device with respect to the destination. For example, in the theater examples presented in FIGS. 7, 10, 11, and 12A, if the system determines that the content is an "arrow," the system must have knowledge of the aforementioned relationships to determine which way the arrow should be pointing to direct the entity toward the destination.

Task T104 recites displaying the differentiated content to the various viewing zones. In this task, an MV device (e.g., sign, light, etc.) is made to display the content intended for the various viewing zones. As previously noted, the same MV sign or MV light can simultaneously display different content to different viewing zones, wherein the content displayed in any one viewing zone is not viewable from other viewing zones.

If there are no sensors (e.g., congestion sensors, environmental sensors, etc.) included in system 100, the method is complete with task T104. Of course, an operator is able to adjust the operation of system 100 based on the operator's observation of the performance of the system (e.g., is the flow characteristic acceptable).

If, however, one or more of such sensors are included in the embodiment of system 100, then processing can continue with method 1400B wherein, in task 105, local conditions are monitored and the sensor data is analyzed. In task T106, a value for the first flow characteristic is estimated/determined based on the sensor readings. Based on the value determined in task T106, in task T107, the system does at least one of the following: (a) takes no action; (b) alters the configuration of one or more viewing zones; or (c) alters the navigational content presented to one or more viewing zones. The system's action can be controlled by a (human) operator or via the system itself in accordance with programming.

In some embodiments, the action taken in task T107 is based on the outcome of a comparison between the determined value of the first characteristic and the desired (value) of the first characteristic. If, for example, the comparison indicates that the desired value of the first characteristic has been achieved, then the system/operator might take no action in accordance with option (a). On the other hand, if the comparison indicates that the desired value of the first characteristic has not be achieved, the system/operator might choose to alter the configuration of one or more viewing zones (option b) and/or alter the navigational content presented to one or more viewing zones. The decision as to selection option (b), (c) or (b)+(c) is a matter of the operator choice (e.g., based on operational experience, etc.) or, if an autonomous decision, based on programming.

Even if the desired value of the first characteristic has been achieved, the system/operator might alter (b) and/or (c) for the purposes of seeing if the flow characteristic can be improved or to obtain data as to the response of the flow characteristic to various perturbations of the system. Thus, the sensor data obtained in task T105 can be used for real-time corrections and/or can be accumulated and stored for the analysis of longer-term trends, etc.

Figure 15:
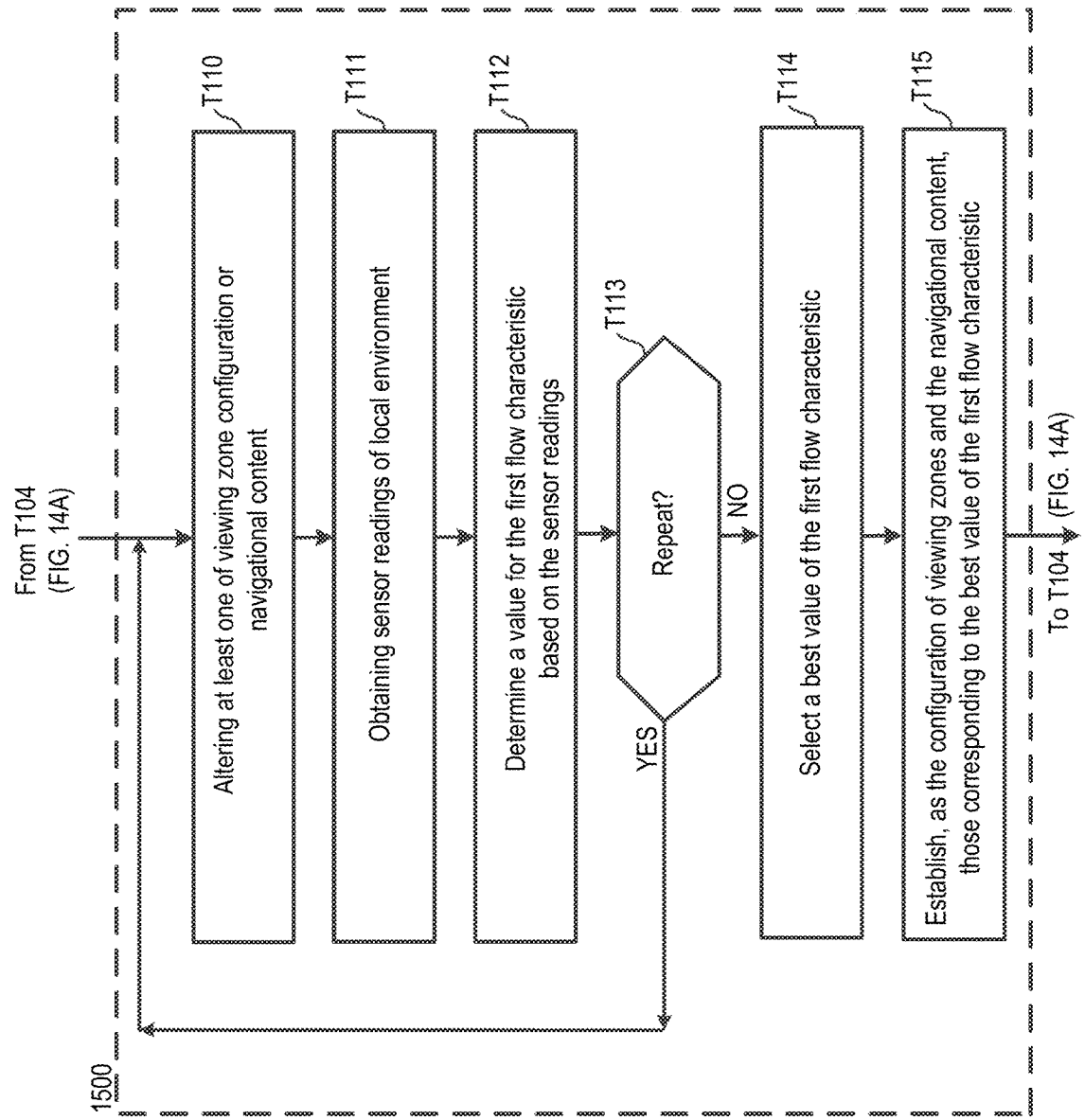
FIG. 15 depicts a method for optimizing the operation of the illustrative embodiment.

In some embodiments, system 100 is configured for autonomous optimization. That is, in some embodiments, system 100 is able to routinely alter its settings to improve its operation. An example of a way to do this is method 1500, depicted in FIG. 15. In light of this disclosure, those skilled in the art will be able to develop additional autonomous optimization methods; method 1500 is one of many optimization techniques that can be used.

Task T110 of method 1500 recites altering at least one of the viewing zone configuration or the navigational content. The viewing zone configuration includes any alterable characteristics of the viewing zone, such as, the size, location, number of zones, etc. Task T111 recites obtaining sensor readings of the local environment. The sensor reading captures information pertaining to the flow characteristic that the system is attempting to control. For example, returning to the theater example, if intent is to minimize bottlenecks as patrons are leaving the theater, then the sensor reading can pertain to the flow of patrons through various exits.

In accordance with task T112, system 100 determines a value for the flow characteristic based on the sensor reading, associates it with the particular viewing zone configuration and navigational content, and everything is stored in the system.

At task T113, query whether steps T110 through T112 are to be repeated. This decision can be based on a given number of alterations or any suitable basis. If the tasks are to be repeated, at least one of the viewing zone configuration or navigational content is again altered, another sensor reading obtained, and a value for the flow characteristic is determined. Once the system determines that no additional alterations are to be made, a best value of the flow characteristic is selected at task T114.

The viewing zone configuration and navigational content the resulted in the best-value flow characteristic are established as the nominal setting for the operation of system 100.

Specific Examples of System 100.

System 100 is useful for any application in which it is advantageous to simultaneously provide different messaging to different entities, wherein only the entities for which a specific message is intended are able to view it.

MV Cautionary and Instructional Signaling System.

Signal lights are often used to communicate with the operators of conveyances, or those in the vicinity of conveyances. These conveyances can include, without limitation, land craft (e.g., automobiles, trucks, buses, motorcycles, bicycles, trains, etc.), aircraft (e.g., planes, helicopters, etc.), and/or watercraft (e.g., boats, ships, ferries, barges, etc.).

The signal lights are used, for example, to direct entities to: stop, go, slow down, speed up, exercise caution, redirect their route, turn left or right, etc. Signal lights can communicate information such as, for example: whether a track switch has been thrown, routes to use or to avoid, a need to exercise caution at a crosswalk, or which berth, gate, stall, bay, fueling station, charging station, or garage to use. Signal lights can serve as a caution, alert, or reminder.

The information provided by signal lights is often relevant to only specific individuals, conveyances, or areas. Notwithstanding the foregoing, in most conventional systems, signal lights are usually visible to others to whom they do not pertain. This can be confusing and even dangerous. In many if not most situations, it would be more effective, efficient, and safer if signal lights simultaneously provided different versions of content, as appropriate, to different entities (i.e., people or conveyances) or locations, wherein only the entities for which a particular version of the content is intended are able to view it.

To these ends, in some embodiments, system 100 is used to implement MV cautionary and instructional signaling systems. These systems improve signaling by projecting content (e.g., light, flashing light, light varying in brightness, light of varying color(s), lighting effects, graphics, letters, numbers, symbols, pictures, etc.) to the precise users (defined via their identity/characteristics or their location; that is, viewing zones) for whom it is intended and by simultaneously providing different content to other users, which includes, as appropriate, not displaying any content at all. And content is only viewable to those for whom it is intended.

In some embodiments, the MV cautionary and instructional signaling system is implemented as a MV "wrong-way" lighting system. The persistent flashing of a wrong-way light may be distracting or confusing to the majority of drivers who are not tempted to turn in the wrong direction onto a one-way road, or to speed down a road that ends at the termination of a pier. To drivers within sightline of the MV wrong-way light, but in an area or at a distance of no imminent danger, the light may appear as a slowly blinking, moderately bright, yellow light. But to drivers who are in a location where they may be immediately required to make a choice whether to turn down a wrong-way road, the light color, brightness, and rate of flashing may be much more "urgent," such as a rapidly flashing, very bright red light.

In another embodiment, the MV cautionary and instructional signaling system implements a MV track switch lighting system. There may not be a need to show indicator/warning lights to a train not on the affected track, or to anyone not in the immediate proximity of the track. In this situation, one or more viewing zones can be established along the pertinent track, as well as at locations that are likely to be occupied by crew, nearby pedestrians, or cross traffic. From these viewing zones, the MV track switch lighting appears to be very conspicuous, while from other zones the light is not visible at all (whereas the light from a conventional switch light would be visible). The immediacy of the danger is communicated by the color, brightness, rate of flashing, and other characteristics of the light.

In these embodiments, the appearance of light from a signal light only when it is relevant imbues the warning with added significance. That is, the import of the warning is not diluted. Also, when the characteristics of the light—its brightness, color, and rate of flashing, for instance—are variable depending on the viewer's location, they can serve to communicate the light's importance to any specific individual.

In yet a further embodiment, the MV cautionary and instructional signaling system is a MV pedestrian crossing signal lighting system that can simultaneously (and from the same light) present different information or signals to different pedestrians, depending on where they are located. Conventional pedestrian crossing signals often display a countdown to let pedestrians know how much time they have to cross the street, or a flashing symbol to encourage those in the street to speed up their crossing and to discourage those on the curb from initiating a crossing. These signals leave it to the pedestrian's judgement to gauge whether the time displayed is sufficient to safely cross the street. But most pedestrians haven't timed themselves crossing a street; they could use more guidance than a countdown. Rather than indicating to pedestrians at the curb they have 5 seconds remaining to cross the street, or displaying a flashing symbol to indicate the light is about to change, the MV pedestrian crossing signal light can indicate that they should not cross. The pedestrian does not have to guess if they can safely cross. Pedestrians on the curb are signaled to cross only when there is enough time to safely do so. When there is not enough time remaining, anyone looking at the signal from the curb will be informed they should not cross. Meanwhile, people on the crosswalk who have already started to cross, and who are looking at the same signal, will see a countdown or a flashing light or a graphic giving them the information needed to complete their crossing. The light may even flash faster to those furthest from the curb toward which they are walking. Different people sharing the same signal each see only the information pertinent to them.

In some embodiments, there are several viewing zones for one MV pedestrian crossing signal light. The first viewing zone is at the opposing curb from the signal and the content seen by anyone in this zone would indicate either "OK to Cross" or "Don't Cross." There is no need for a countdown clock or flashing graphic because it would not be left to the pedestrian's discretion as to whether there was time to safely make the crossing. In some embodiments, there are a series of viewing zones located on the crosswalk at incremental distances from the signal. The content associated with each of these viewing zones is based on the distance to reach the opposing curb within the remaining time, as a function of an average walking speed. Further adjustments to content can be made, for example, based on sensor readings (e.g., congestion sensors 108, and/or environmental sensors 110, and/or recognition sensors 112, etc.) of the mobility, group size, speed, or other criteria.

When the MV pedestrian crossing signal lighting system includes sensors, there is a potential for further improvements in safety and system performance. For instance, by collecting data on the time needed to cross the street as a function of time-of-day, traffic patterns, numbers of pedestrians, weather, pedestrian characteristics, and other variables, the MV crossing signal light can self-adjust the content it displays and/or the viewing zone layout. If the system detects pedestrians attempting to cross the street without adequate time to complete the crossing, the content and viewing zones can be self-adjusted to compensate. Autonomous changes can be made if traffic is stopped longer than necessary, or if pedestrians are waiting too long at the curb, or if pedestrians are running across the street. Optimal settings can be changed with variables such as date, day, time, weather, or other considerations that are observed to impact crossing. Through a series of refinements and measurements using the sensors, the system can establish its own optimal settings. In some embodiments, limits can be set so the system does not overcompensate or experiment in ways deemed to be risky or unsafe.

In yet a further embodiment, the MV cautionary and instructional signage system provides a MV boarding signage system for passengers boarding a train or subway. The sign alerts passengers to the imminence of doors closing. Passengers who are too far away to safely board are shown a red "Do Not Board" signal. Passengers with the potential of safely boarding see a rapidly flashing yellow light, and passengers next to the door see a green light. Messaging can be differentiated based on crowding and capacity, so that people further from the train are not encouraged to push their way toward the doors but are instead shown a "Wait Until Next Train" or "Train Full" message or simply a red light.

MV Directional Lighting System.

In various embodiments, system 100 is implemented as a lighting system for directing conveyances or people. And the benefit they bring to all such application is that MV directional lights can simultaneously provide different guidance to different conveyances while not being viewable to conveyances for whom the lights are not intended.

With respect to conveyances, system 100 can be implemented as a MV transportation directional lighting system, providing, for example, runway lights or lights for various forms of mass transit. For example and without limitation, in some embodiments, MV transportation directional lights outline an aircraft runway, a shipping lane, or truck yard route. Additionally, MV transportation directional lights are used to provide directions or instructions for operators of conveyances and equipment, such as in a cargo facility, warehouse, military site, train depot, harbor, bus station, parking lot, rail yard, and the like.

When the system is implemented to provide a MV landing-lighting system, an aircraft approaching an airfield can be made to see only the lights outlining its designated landing strip, while lights for other runways are visible only to aircraft assigned to them. A grid of MV landing lights, which can be networked, outline different landing strips for different aircraft at the same time. Some of the MV lights are likely to be shared by the multiple landing strips where the strips overlap, and will therefore be viewable at the same time by multiple aircraft. Other MV lights are likely only to be visible at any given time to a single aircraft, or to no aircraft at all. So, for example, the same MV landing lights at the same time can direct a first aircraft where to land, provide a second aircraft with different landing directions, and can signal a third aircraft not land.

Since incoming aircraft will be in constant motion, they must be tracked, such as via usual conventional aircraft-tracking techniques (e.g., radar, etc.), to implement a MV landing-lighting system. The viewing zone, and the content associated with or linked to the zone, would therefore "attach" to the aircraft tracked aircraft. Nearby viewing zones will in most cases require multiple reconfigurations to accommodate any particular aircraft's path and to account for other aircraft within the sightline of the MV signal intended for the particular aircraft.

The lights of a MV landing-lighting system can be controlled to turn "on" and "off" simultaneously or in various sequences, to provide directions or for other reasons. The lights can be controlled to appear to "chase" each other, with an illuminated light seeming to move among non-illuminated lights. Or, a red light can be controlled so that it appears to move sequentially among white lights, etc.

MV transportation directional lighting will typically, but not necessarily, be embedded (e.g., roadway, runway, ground, floor, etc.); mounted (e.g., posts, walls, fences, barriers, buildings, or rooftops, etc.); or suspended (e.g., drones, aircraft, etc.).

With respect to directing people, and returning to the airport as an example, when viewed from the ground, MV lights on structures, such as the control tower, terminal, or service buildings can be used to direct ground-support personnel associated with a particular aircraft to their proper positions and simultaneously direct the ground-support personnel associated with other aircraft to their proper positions without confusing either of the support teams. Or, within an airline terminal, MV lights can be used to simultaneously direct individual passengers to different gates to catch their flights, wherein each passenger sees only the directions intended for them. Once again, such systems require that individual passengers be recognized and tracked (although not necessarily by the passenger's actual name/identity, but rather as a recognizable "blob" that has been associated with a specific destination).

As with other implementations of system 100, the content intended for each viewing zone and/or the viewing zones themselves, can be fixed (non-varying) or alterable via sensor input, operator input, via timers or schedules, or as requested by content recipients.

Among the important benefits provided by a MV directional lighting system is a reduction in distraction and confusion when different lights, viewable to all, are being used to simultaneously inform different entities headed along different paths. In the runway-lighting example, instead of dedicating some lights to one aircraft, and other lights to another aircraft with the hope that the crew in each aircraft is able to distinguish the lights intended specifically for them, the same lights can instead be perceived by the crew of each aircraft to all be dedicated solely for their use. Consequently, more lights are potentially available for each aircraft, since each light may now serve multiple aircraft. With MV transportation directional lighting, all visible lights are pertinent to each aircraft.

MV Exit, Entrance, and Evacuation Signage System.

System 100 can be implemented to provide a MV exit, entrance, and evacuation signage system. Conventional exit and evacuation signs typically draw people toward the closest, most conspicuous exit. Patrons exiting a theater might naturally walk toward the nearest exit sign, although that particular exit might lead to a constricted hallway that can't handle a significant crowd, or might be ill-suited to patrons in wheelchairs, or might be temporarily blocked or hazardous, or might lead to an area not intended for the current audience, or might lead to an exclusive area intended only for certain audience members.

Implementing system 100 as a MV exit, entrance, evacuation signage system can result in making the sign more visible, or exclusively visible to the certain individuals and conveyances. Unlike conventional exit signs, which are static, a MV exit, entrance, evacuation signage system can, in some embodiments, compensate for crowd size, congestion, hazards, and other static and dynamic conditions that might make an exit that is further away, or less conspicuous, a better choice.

MV exit, entrance, and evacuation signage systems were disclosed earlier in this specification in the context of theater and stadium environments. Some scenarios in which it is useful to make the viewing zones dynamic and the content dynamic were disclosed. A few additional scenarios are disclosed below.

In a theater environment, it might be desirable that during a performance, all the people in all the viewing zones associated with all the MV exit signs would see only the standard "EXIT" message, with whatever font size, brightness, and color is required by code. Everyone would see the same version of EXIT on all the MV exit signs. It is only when the performance ends that other versions of content are shown that feature larger, brighter, and/or flashing fonts. This "differentiated-content" mode—the mode that shows different content to different viewing zones—can, for example, be triggered manually, by a timer or automation; or by sensors that detect when the audience is on the move, or that the show is over, or that an alarm has been triggered, or that smoke is detected, or that the sprinklers are operating, or that the lights are on, or through some other method.

In an emergency, for example, MV exit signs near access ways that lead to dangerous/problematic areas can display to every viewing zone versions of content that say "NO EXIT," or show no message at all, while MV exit signs near safe routes show versions of content that feature large, bright, flashing, highly visible "EXIT" messages. When emergency personnel arrive, the MV exit signs near the access way that they are using can, for example, be changed to a message discouraging its use by patrons.

Also, in embodiments in which the MV exit, entrance, and evacuation signage system includes sensors, information obtained from the sensors can be processed (either via analysis software or by system operators) to improve system performance. For example, in some embodiments, the system monitors the effectiveness and efficiency of exiting with various combinations of viewing-zones, versions of content, crowd size, time-of-day, type of event, and other variables. Changes can be made based on software analysis tools. Or, the system itself might cycle through a variety of incremental changes in settings, or various versions of settings, for comparison and analysis.

It was previously disclosed that in some embodiments, recognition and tracking technologies are applied to provide specific exiting or other information to special-case individuals, such as persons using a wheelchair, seniors, families, celebrities, premium ticket holders, or others who might require or desire differentiated messaging. Once an individual is identified, their movements may be tracked so their body—specifically their eyes—may be continuously captured within a viewing zone associated with their designated message. As the individual moves, the viewing zone moves with them, and they can continue to see their assigned content. This technology can be used, for example, to direct specific individuals to an after-show party, a separate event, or valet parking.

MV Emergency Vehicle Lighting System & MV Emergency Lighting System.

Typically, emergency-vehicle lights and other warning/hazard/caution lights indiscriminately bath an area with flashing red lights that can be distracting. For example, emergency responders, medical personnel, victims, witnesses, investigators, crowd-control personnel, and others might be adversely impacted by strobing emergency lights that are intended to warn passersby and traffic to stay clear of the site, but do so at the expense of the ability of those that are at the site to concentrate, etc.

System 100 can be implemented to provide a MV emergency vehicle lighting system or a MV emergency lighting system (hereinafter "MV emergency lighting." The light emitted from MV emergency lights are directed such that they are viewable only to their intended audience.

For example, one such audience might consist of responders that must get to the site of an incident whereas another audience might be those that need to be warned to avoid the site of incident. By virtue of its capabilities, MV emergency lighting can, for example, provide a steady white light that helpfully illuminates a site of the incident for responders while the same lighting at the same time presents pulsing red lights to approaching drivers, cyclists, and pedestrians to warn them off.

Applications for MV emergency lighting include, without limitation: various vehicles, such as land vehicles (e.g., police, fire, ambulance, etc.), water craft, and aircraft. Other emergency lighting applications includes, without limitation: use on barriers, cones, dividers, signage, fences, buoys, docks, and in buildings.

In some embodiments, the user interface for laying out viewing zones, and for assigning content to each viewing zone, is found on the emergency light itself. In some other embodiments, a personal device (e.g., smart phone, tablet, or laptop, in-vehicle device, etc.) running a suitable application functions as the user interface. In some embodiments, the user interface is located close to MV emergency lights located in a building, such as in an IT center or kiosk.

In use, in some embodiments, the user interface includes a screen that displays the environment surrounding the MV emergency light, from which the light is visible. In some embodiments, a camera mounted adjacent to the MV emergency light provides this perspective. In some other embodiments, the interface comprises a map or layout of the vicinity, such as provided by a service or application. In some embodiments, the visual representation of the surrounding area is simply a grid.

In some embodiments, the user defines viewing zones, such as by drawing them on the visual representation of the space, using a pointing device or other technique. In some embodiments in which the viewing region is represented by a grid, the user creates viewing zones by identifying/designating the grid lines, etc.

In some further embodiments, the user interface enables a user to set viewing zones on a directional basis. For example, in some embodiments, the user interface has a zero-degree baseline direction. From this reference, the user then selects degrees to establish boundaries for viewing zones. For example, perhaps from 0 to 180 degrees is the area to the right of an emergency vehicle that includes the sidewalk where victims and witnesses are located, and where a version of content is needed that consists of a steady white light. From 180 to 360 degrees is the area that includes the street where damaged cars are located, and a version of content is desired that consists of flashing red warning lights.

Similarly, compass directions might be inputted or selected on an interface to establish viewing zone boundaries. In some further embodiments, addresses, coordinates, markers, physical characteristics and landmarks (e.g., buildings, street lamps, curbs, intersections, etc.) and other designations are used to establish viewing zone boundaries. In still further embodiments, a user inputs distances from the MV emergency light that serve as boundaries for viewing zones.

In some embodiments, the user interface does not include a visualization of the area surrounding the MV emergency light. Rather, the interface is a dial, buttons, touchscreen, keyboard, or number pad that establish stops on a range of degrees radiating from the MV emergency lighting to define viewing zones. In some further embodiments, degrees on a compass are used to specify viewing zones. In still additional embodiments, an address, GPS coordinates, or distances are used to specify viewing zones.

Alternatively, a user paces off the viewing zones with a location-sensing technology, or place markers in the environment to define the boundaries of the viewing zones.

In some embodiments, any of the aforementioned interfaces enable a user to designate content for each viewing zone. For instance, in some embodiments, a menu of options are provided that enable a user to select a type of light for each viewing zone and to select brightness; changes in intensity of brightness (fade and intensify), color, alternating colors; effects such as flashing, flickering, etc., including the frequency, rate, duration, and patterns thereof. In some embodiments, the interface permits the user to design versions of content for each viewing zone.

Although the user interface is discussed above in the context of a MV emergency light, the various embodiments of and uses for the user interface applies to all the MV lighting and signage applications presented herein.

Consider an example wherein a vehicular accident, in which damaged cars have been pulled to the side of the road, and injured and uninjured vehicle occupants, as well as witnesses, responding officers, and paramedics have gathered on the sidewalk. There are MV emergency lights on the police cars, on the ambulance, on the firetrucks, and on portable safety cones set up by the police. Viewing zones are established for each of the MV emergency lights, wherein a first zone is intended for traffic on the street, a second zone for the sidewalk area occupied by people involved in the accident, and a third zone for neighboring homes and businesses. The content for the first zone is flashing red lights so street traffic slows and exercises caution. The content for the second zone is a steady white light that provides illumination for taking reports, inspecting vehicles, and attending to the injured. The content for the third zone is no light at all, so as to not distract businesses and residents in their homes.

In this situation, each MV emergency light is simultaneously showing three (or more) versions of content, so that people in each of viewing zones looking at the light at the same time will see a different lighting effect: a flashing red light, a steady white light, or no light at all.

Another example is that of a construction site, where workers need to perform their tasks without the distraction of flashing lights. At the same time, the flashing lights are necessary to warn passersby of hazards such as the activities of construction vehicles and equipment, blocked lanes, detours, personnel working near traffic, and debris on the road and sidewalk.

In such a scenario, at least some of the MV emergency lights are mounted on or incorporated in, cones, barriers, and construction vehicles. In some embodiments, each light can be a detachable unit that can be freestanding.

As drivers approach the construction site, they see cautionary yellow lights flashing at a moderate rate and at a medium level of brightness. However, in areas where construction vehicles are entering and present on city streets, the lights appear brighter, are red, and flash faster. Similarly, at locations where pedestrians or cyclists might be affected, the lights intensify. These transitions enable everyone to better understand they are approaching an increasingly hazardous condition and need to be increasingly careful. The lights are providing more information by relaying the proximity of the hazard, and not just its presence in the general area.

At the same time, the light from the same lighting units might not be visible, or simply a helpful source of steady illumination, to construction workers that are on site.

Definitions

In addition to the definitions of terms previously provided, the following terms and their inflected forms are defined for use herein and the appended claims as follows:

"Associating," when used in the context of a relationship between content and a location, means that the content is intended to be displayed to the location (which can be either the specific location(s) of a viewer(s) or a zone large enough to accommodate plural viewers.

"Content portion" is the content that is displayed to a given spatially distinct zone.

"Differentiated content" means plural content portions that differ from one another in terms of the content.

"Beamlet" is an elemental entity of light emitted by a multi-view pixel in a multi-view display. The word does not appear in standard dictionaries; it has been created herein for the purposes of this disclosure. In some implementations of multi-view pixels, a multi-view pixel resembles a conventional image projector. A conventional image projector projects a plurality of narrow light beams toward a projection screen. Each light beam resembles the beam of light emitted by a searchlight or by a lighthouse. With a conventional projector, there is one such beam for each projected pixel. Because of the large number and typically small size of such beams the word "beamlet" has been created to refer to one of them. A multi-view pixel is similar to an image projector in that it emits a number of beamlets, but the beamlets are not intended for forming an image on a screen. Rather, they are intended to fall upon the eyes of a viewer. Generally, the intended viewer is human, but optical devices such as cameras can also be used with a multi-view display, and it is possible to envision applications of multi-view displays wherein intended viewers might be non-human viewers such as animals, cameras or other image-capturing entities.

In a multi-view pixel, each beamlet's light can be controlled independently of the light of other beamlets. For example, and without limitation, the light intensity and/or color of an individual beamlet might be controllable independently of the intensity and/or color of the light of other beamlets. Other parameters of beamlet light might also be controlled, such other parameters comprise, for example, spectral composition, polarization, beamlet shape, beamlet profile, overlap with other beamlets, focus, spatial coherence, temporal coherence, etc., to name just a few.

A viewer that looks at a multi-view pixel sees the light of one or more beamlets; in particular, the viewer sees the light of those beamlets that are emitted by the multi-view pixel and fall upon a viewer's pupil. The viewer perceives the multi-view pixel as glowing with the combined light of those beamlets. As with conventional pixels, a multi-view pixel can have a variety of shapes, as perceived by the viewer that looks at the multi-view pixel.

A beamlet is distinct from a ray in that, like a flashlight beam, they extend over a range of angles. However, in most implementations, they are quite narrow. For convenience of description, the beamlet can be approximated as a ray with a well defined direction and single point of intersection with an illuminated surface.

"Multi-view display" is a display able to show different images to different viewers. Based on the position of the viewer relative to the multi-view display, individual viewers may see different images from one another while simultaneously looking at the same multi-view display. This is in contrast to conventional displays, which show the same image to all viewers regardless of where the viewers are positioned relative to the display. In a multi-view display an image is formed as a collection of pixels that comprises multi-view pixels.

"Multi-view pixel" is the smallest image-forming unit of a multi-view display. A multi-view pixel is a more flexible version of the type of pixel used in conventional (non-multi-view displays). In a typical conventional display, pixels emit light in response to electrical excitation, and the brightness of a pixel depends on the extent of excitation. Each conventional pixel emits light in all directions, such that all viewers perceive the pixels the same way, regardless of viewer position.

A multi-view pixel, instead, can control not just the brightness, but also the spatial distribution of emitted light. In particular, a multi-view pixel can be commanded, for example, to emit light in certain directions but not others; or it can be commanded to independently adjust the brightness of light emitted in different directions. Other parameters of emitted light can also be adjusted independently for different directions of emission.

"Viewing region" of a multi-view display means the range of possible positions from which viewers of the multi-view display can experience the multi-view display functionality. In particular, the multi-view pixels of the multi-view display can emit beamlets in a range of possible directions. A viewer must be within that range in order to see at least one beamlet; otherwise, the multi-view pixel will not be usable for image forming. For a viewer to see an image that covers the entire display surface of the multi-view display, the viewer must be within the beamlet range of all multi-view pixels. The viewing space is any place in which at least one beamlet of a multi-view pixel of the multi-view display is observable.

Display designers are typically given a target range of possible positions for viewers to view a display. In a multi-view display, it is advantageous to orient multi-view pixels, relative to one another, such that all beamlet ranges overlap at all those viewer positions. Generally, this is likely to result in different orientations of multi-view pixels in different portions of the display surface, and it will be difficult to know, a priori, the relative orientation of all multi-view pixels. Calibration, such as discussed in co-pending U.S. application Ser. No. 15/002,014, can provide the necessary orientation information and thus allow display designers the freedom to orient multi-view pixels as needed.

"Spatially distinct zone" are one or more defined sections within the viewing region. Within a given spatially distinct zone, the MVD provides a common experience, such as by displaying the same content to viewers anywhere within that zone. The content assigned to a particular spatially distinct zone is, in some cases, assigned based on the existence of a contextual relationship between the content and the zone. A non-limiting example of such a contextual relationship is that if a first spatially distinct zone is closer to an MVD than a second spatially distinct zone, the content presented to the first spatially distinct zone might include more text, smaller text, or a more detailed image, etc., than the content presented to the second spatially distinct zone. The content displayed to the first and second spatially distinct zones, as in the example, are referred to individually as "content portions," as per the definition above. To the extent that the content portions that are displayed to the first and second spatially distinct zones differ from one another, they are collectively referred to as "differentiated content." In embodiments in which there are plural spatially distinct zones within the viewing region (as is typical), such zones need not be contiguous. As applicable, each spatially distinct zone can be considered a three-dimensional space (i.e., an area and height) or simply an area.

"Viewing location" is a specific location from which a single viewer may observe the display. There will typically, but not necessarily, be plural viewing locations in a spatially distinct zone or in the viewing region.

It is to be understood that the disclosure describes a few embodiments and that many variations of the invention can easily be devised by those skilled in the art after reading this disclosure and that the scope of the present invention is to be determined by the following claims.

What is claimed:

1. A method for operating a multi-view signage system, comprising:
   determining a desired first flow characteristic in a local environment;
   establishing viewing zones in the local environment;
   determining navigational content to be displayed for each viewing zone to facilitate the desired first flow characteristic, wherein the navigational content is differentiated such that the navigational content displayed to at least some viewing zones is different from the navigational content displayed to other of the viewing zones;
   obtaining sensor readings of the local environment;
   determining a value for the first flow characteristic based on the sensor readings;
   comparing the value for the first flow characteristic with the desired first flow characteristic;
   based on the comparison, performing one of (a) through (d), as follows:
   (a) alter one or more of the viewing zones,
   (b) alter the navigational content,
   (c) alter both one or more of the viewing zones and the navigational content,
   (d) do not alter either one or more viewing zones and do not alter the navigational content; and
   displaying the navigational content or the altered navigational content to the viewing zones simultaneously via a multi-view device, wherein the navigational content or the altered navigational content presented to any one of the viewing zones is only viewable from the one viewing zone to which same is presented.

2. The method of claim 1 wherein determining a first flow characteristic further comprises establishing at least one destination in the local environment.

3. The method of claim 1 and further wherein when the comparison indicates that the desired flow characteristic is not achieved, performing one of (a) through (c).

4. The method of claim 1 and further wherein when the comparison indicates that the desired flow characteristic is achieved, determining the response of the flow characteristic to various pertubations of the system by performing one of (a) through (c).

5. The method of claim 1 and further wherein when the comparison indicates that the desired flow characteristic is achieved, determining if the flow characteristic can be improved by performing one of (a) through (c).

6. The method of claim 1 and further wherein when the comparison indicates that the desired flow characteristic is achieved, neither the viewing zones nor the navigational content is altered.

7. The method of claim 2 wherein the viewing zones are related to at least one of the first flow characteristic and the destination.

8. The method of claim 1 wherein establishing the viewing zones further comprises tracking a first entity and a second entity and attaching one of the viewing zones to the first entity and another of the viewing zones to the second entity.

9. The method of claim 2 wherein determining the navigational content to be displayed for each of the viewing zones further comprises:
   establishing the location of the viewing zone with respect to a multi-view device, and
   establishing the location of the multi-view device with respect to the destination.

10. The method of claim 2 wherein the navigational content to be displayed for each of the viewing zones is related to a distance from each viewing zone to the destination.

11. The method of claim 1 wherein the navigational content to be displayed for each of the viewing zones is related to a rate of movement of an entity.

12. The method of claim 2 and further comprising determining a second flow characteristic in the local environment, wherein the first flow characteristic comprises movement of a first entity towards the at least one destination and the second flow characteristic comprises movement of a second entity away from the at least one destination.

13. The method of claim 2 wherein the at least one destination is selected from the group consisting of: the location of a hazard, an airport runway, an access way, a gate in an airline terminal, a roadway, a portion of a roadway, and railroad tracks.

14. The method of claim 1 wherein the local environment is a public venue.

15. The method of claim 8 wherein determining navigational content further comprises:
   recognizing the first entity; and
   receiving first characterizing information pertaining to the first entity.

16. The method of claim 15 and further wherein a first destination is established for the first entity based on the first characterizing information, and further wherein determining navigational content further comprises directing the first entity to the first destination.

17. The method of claim 16 wherein determining navigational content further comprises:
 establishing the location of the first entity with respect to the multi-view device, and
 establishing the location of the multi-view device with respect to the destination.

18. A method for operating a multi-view signage system, comprising:
 determining a desired first flow characteristic in a local environment;
 establishing viewing zones in the local environment;
 determining navigational content to be displayed for each viewing zone to facilitate the desired first flow characteristic, wherein the navigational content is differentiated such that the navigational content displayed to at least some viewing zones is different from the navigational content displayed to other of the viewing zones;
 (i) altering at least one of:
  (a) a configuration of the viewing zones,
  (b) the navigational content to be presented to one or more of the viewing zones;
 (ii) obtaining sensor readings of the local environment;
 (iii) determining a value for the first flow characteristic based on the sensor readings;
 (iv) repeating (i), (ii), and (iii) a plurality of times;
 (v) selecting a best value of the first flow characteristic; and
 (vi) establishing:
  (a) as a configuration of the viewing zones, the configuration that resulted in the best value of the first flow characteristic; and
  (b) as a version of the navigational content to be displayed, first navigational content that resulted in the best value of the first flow characteristic; and
 displaying the first navigational content to the viewing zones simultaneously via a multi-view device, wherein the first navigational content presented to any one of the viewing zones is only viewable from the one viewing zone to which same is presented, and wherein the first navigational content displayed to at least some of the viewing zones is different from the navigational content displayed to other of the viewing zones.

19. The method of claim 18 wherein determining a first flow characteristic further comprises establishing at least one destination in the local environment.

20. The method of claim 19 wherein the viewing zones are related to at least one of the first flow characteristic and the destination.

21. The method of claim 18 wherein establishing the viewing zones further comprises tracking a first entity and a second entity and attaching one of the viewing zones to the first entity and another of the viewing zones to the second entity.

22. The method of claim 19 wherein determining the navigational content to be displayed for each of the viewing zones further comprises:
 establishing the location of the viewing zone with respect to a multi-view device, and
 establishing the location of the multi-view device with respect to the destination.

23. The method of claim 19 wherein the navigational content to be displayed for each of the viewing zones is related to a distance from each viewing zone to the destination.

24. The method of claim 19 wherein the navigational content to be displayed for each of the viewing zones is related to a rate of movement of an entity.

* * * * *